US011780461B2

(12) United States Patent
Larsson

(10) Patent No.: US 11,780,461 B2
(45) Date of Patent: Oct. 10, 2023

(54) LATERAL ACCELERATION CONTROL FOR AUTONOMOUS DRIVING

(71) Applicant: Aptiv Technologies Limited, St. Michael (BB)

(72) Inventor: Oskar Larsson, Gothenburg (SE)

(73) Assignee: Aptiv Technologies Limited, St. Michael (BB)

( * ) Notice: Subject to any disclaimer, the term of this patent is extended or adjusted under 35 U.S.C. 154(b) by 180 days.

(21) Appl. No.: 17/455,666

(22) Filed: Nov. 18, 2021

(65) Prior Publication Data

US 2022/0250643 A1    Aug. 11, 2022

(30) Foreign Application Priority Data

Feb. 9, 2021 (EP) .................................. 21156010

(51) Int. Cl.
*B60W 30/12* (2020.01)
*B60W 40/109* (2012.01)
(Continued)

(52) U.S. Cl.
CPC .......... *B60W 60/001* (2020.02); *B60W 30/12* (2013.01); *B60W 30/18163* (2013.01);
(Continued)

(58) Field of Classification Search
CPC ............... B60W 60/001; B60W 30/12; B60W 30/18163; B60W 40/109; B60W 50/00;
(Continued)

(56) References Cited

U.S. PATENT DOCUMENTS 10,994,774 B2 * 5/2021 Bajpai ..................... H04N 23/54
2011/0015850 A1 * 1/2011 Tange .................. B60T 8/17557
701/116

(Continued)

FOREIGN PATENT DOCUMENTS

DE    102019208525    12/2020
EP    2853457        4/2015
WO    2020035728     2/2020

OTHER PUBLICATIONS

"Extended European Search Report", EP Application No. 21156010.7, dated Aug. 27, 2021, 6 pages.
(Continued)

*Primary Examiner* — Peter D Nolan
*Assistant Examiner* — Ashley L Redhead, Jr.
(74) *Attorney, Agent, or Firm* — Sawtooth Patent Group PLLC

(57) ABSTRACT

A method of determining a target lateral acceleration of a vehicle for use in autonomous control of the vehicle to drive along a road, comprising: evaluating each of a plurality of scalar velocity functions at a plurality of key lateral positions predefined with respect to a model of the road to generate a respective set of scalar velocity values; combining the velocity values calculated for each key lateral position to generate a respective target lateral velocity value, the velocity values calculated for each of the key lateral positions being combined by adding the greatest of zero and the velocity values, to the smallest of zero and the velocity values; generating a lateral velocity field by interpolating
(Continued)

between the target lateral velocity values; and determining the target lateral acceleration of the vehicle using the lateral velocity field and a measured lateral velocity of the vehicle.

18 Claims, 10 Drawing Sheets

(51) Int. Cl.
  *B60W 50/00* (2006.01)
  *B60W 60/00* (2020.01)
  *B60W 30/18* (2012.01)

(52) U.S. Cl.
  CPC .......... *B60W 40/109* (2013.01); *B60W 50/00* (2013.01); *B60W 2050/0031* (2013.01); *B60W 2520/12* (2013.01); *B60W 2520/125* (2013.01); *B60W 2552/10* (2020.02); *B60W 2552/30* (2020.02); *B60W 2554/4042* (2020.02); *B60W 2554/801* (2020.02); *B60W 2554/802* (2020.02); *B60W 2555/60* (2020.02); *B60W 2710/20* (2013.01); *B60W 2720/125* (2013.01)

(58) Field of Classification Search
  CPC ..... B60W 2050/0031; B60W 2520/12; B60W 2520/125; B60W 2552/10; B60W 2552/30; B60W 2554/4042; B60W 2554/801; B60W 2554/802; B60W 2555/60; B60W 2710/20; B60W 2720/125; B60W 2050/0027; B60W 40/105; B60W 2050/0043; B60W 2520/10
  See application file for complete search history.

(56) References Cited

U.S. PATENT DOCUMENTS

| | | |
|---|---|---|
| 2019/0291726 A1 | 9/2019 | Shalev-Shwartz et al. |
| 2020/0148260 A1 | 5/2020 | Wu et al. |
| 2020/0156631 A1 | 5/2020 | Lin et al. |
| 2021/0024065 A1 | 1/2021 | Mizoguchi |
| 2021/0271988 A1* | 9/2021 | Bouton ................ G05D 1/0221 |
| 2022/0332318 A1* | 10/2022 | Sakayori ............... B60W 30/16 |

OTHER PUBLICATIONS

"Extended European Search Report", EP Application No. 21155970.3, dated Aug. 27, 2021, 8 pages.
Diehl, et al., "Radar-based Dynamic Occupancy Grid Mapping and Object Detection", Aug. 9, 2020, 6 pages.
Hoermann, et al., "Dynamic Occupancy Grid Prediction for Urban Autonomous Driving: A Deep Learning Approach with Fully Automatic Labeling", Nov. 7, 2017, 8 pages.
Larsson, "The Oskillator Artificial Force Field Highway Chauffeur", Jan. 2017, 85 pages.
Nuss, "A Random Finite Set Approach for Dynamic Occupancy Grid Maps with Real-Time Application", Sep. 10, 2016, 20 pages.
Shalev-Shwart, et al., "On a Formal Model of Safe and Scalable Self-Driving Cars", Oct. 27, 2018, 37 pages.
Steyer, "Grid-Based Enironment Estimation Using Evidential Mapping and Particle Tracking", Sep. 2018, 13 pages.
Wang, "Study of Lane Change Trajectory Planning Considering of Driver Characteristics", Aug. 2018, 10 pages.
Wolf, et al., "Artificial Potential Functions for Highway Driving with Collision Avoidance", May 2008, 6 pages.

* cited by examiner

LATERAL ACCELERATION CONTROL FOR AUTONOMOUS DRIVING

CROSS-REFERENCE TO RELATED APPLICATION

This application claims priority to European Patent Application Number 21156010.7, filed Feb. 9, 2021, the disclosure of which is hereby incorporated by reference in its entirety herein.

BACKGROUND

Autonomous driving functionality is a feature of modern vehicles which has been attracting increasing interest. Autonomous driving functionality may allow the driver of a host vehicle to hand over the control of both acceleration and steering of the vehicle to an autonomous driving system, which may be provided with a target velocity and headway time or more detailed information of an intended route. The autonomous driving system may then attempt to achieve the desired velocity through acceleration and steer the vehicle so as to follow a chosen lane.

An autonomous driving system may be further adapted to react appropriately to the actions of other road-users. For example, when the host vehicle approaches a slower-moving vehicle ahead of it, the autonomous driving system may decide whether to overtake the slower-moving vehicle or to slow down and to keep a desired headway distance to the vehicle ahead. The autonomous driving system may additionally switch lanes to follow a desired route. More advanced versions of the system may even predict the behavior of other road-users to determine appropriate actions and reactions. Accordingly, autonomous driving systems are generally configured to obtain information from equipment such as radars, cameras, inertial measurement units etc., to collect data about the host vehicle and its environment in order to generate a high-level environment model describing the road and the traffic on it.

The autonomous driving system may then be further arranged to determine a maneuver to be performed by the host vehicle and how this maneuver may be executed (in other words, to determine a trajectory for the host vehicle and appropriate control signals, such as for an acceleration and a steering angle of the host vehicle, that are required to achieve the determined trajectory), and to control the host vehicle to perform the determined maneuver. The two main approaches to autonomous driving algorithms are rule-based, and statistical models including those based on machine learning, cost functions, etc.

SUMMARY

Example aspects herein generally relate to the field of autonomous driving and, in particular, techniques for determining a target lateral acceleration of a host vehicle relative to a road along which the host vehicle is travelling, for use in autonomous control of the host vehicle. The present inventor has devised, in accordance with a first aspect herein, a method of determining a target lateral acceleration of a host vehicle relative to a road along which the host vehicle is travelling, for use in autonomous control of the host vehicle to be driven along the road in accordance with predetermined driving rules. The method comprises evaluating each scalar velocity function of a plurality of scalar velocity functions at a plurality of key lateral positions predefined with respect to a model of the road to generate a respective set of scalar velocity values, wherein values of each scalar velocity function bias the autonomous control towards controlling the host vehicle to be driven along the road in accordance with a respective one of the driving rules. The method further comprises combining the scalar velocity values generated for each key lateral position of the plurality of key lateral positions to generate a respective target lateral velocity value for the key lateral position, the scalar velocity values generated for each of the key lateral positions being combined by adding a first value, which is the greatest of zero and the scalar velocity values, to a second value, which is the smallest of zero and the scalar velocity values. The method further comprises generating a lateral velocity field by interpolating between the target lateral velocity values generated for the plurality of key lateral positions, and determining the target lateral acceleration of the host vehicle using the generated velocity field and a measured lateral velocity of the host vehicle.

The road may comprise a plurality of lanes, and the plurality of scalar velocity functions may further comprise a lane-following velocity function which biases the autonomous control towards controlling the host vehicle to remain within a lane of the plurality of lanes. The method may further comprise calculating, for each of the plurality of key lateral positions, a respective lane-following scalar velocity value of the lane-following velocity function, and generating the respective target lateral velocity for each key lateral position may further comprise combining the lane-following scalar velocity value for the key lateral position with an auxiliary velocity value obtained by the combining of the scalar velocity values calculated for the key lateral position, by adding a third value, which is the greatest among zero, the lane-following scalar velocity value and the auxiliary velocity value, to a fourth value, which is the smallest among zero, the lane-following scalar velocity value and the auxiliary velocity value.

Additionally or alternatively, the road may comprise a plurality of lanes, and the plurality of scalar velocity functions may comprise two or more of: a weak preference function that biases the autonomous control to lead the host vehicle towards a default lane among the plurality of lanes; a strong preference function that biases the autonomous control to lead the host vehicle towards a preferred lane among the plurality of lanes when the host vehicle is not in the preferred lane, and prevent the host vehicle from leaving the preferred lane when the host vehicle is in the preferred lane; an overtaking function that biases the autonomous control to lead the host vehicle towards a faster lane among the plurality of lanes in a case where the host vehicle is approaching a slower-moving vehicle; and a no-cut function that biases the autonomous control to prevent the host vehicle from moving into a lane of a vehicle being overtaken by the host vehicle in a case where a distance along the road between the host vehicle and the vehicle being overtaken is less than a threshold distance.

Where the road comprises a plurality of lanes, the scalar velocity values of each calculated set of scalar velocity values may be calculated by evaluating the respective scalar velocity function only at the key lateral positions, and each key lateral position may be one of: a boundary of a lane among the plurality of lanes; or an edge of a bias region within a lane among the plurality of lanes, the bias region within each lane extending along the lane. Generating the respective target lateral velocity for each key lateral position may further comprise: in a case where the key lateral position is a boundary of a lane among the plurality of lanes, weighting the target lateral velocity generated for the key lateral position with a first weighting factor; and in a case where the key lateral position is an edge of a bias region within a lane among the plurality of lanes, weighting the target lateral velocity generated for the key lateral position with a second weighting factor, wherein the first weighting factor is greater than the second weighting factor.

Interpolating between the target lateral velocity values generated for the plurality of key lateral positions may comprise performing quadratic interpolation between the respective target lateral velocity values generated for each pair of adjacent key lateral positions among the plurality of key lateral positions.

Determining the target lateral acceleration may comprise using the generated lateral velocity field and the measured lateral velocity of the host vehicle to determine the target lateral acceleration of the host vehicle using linear approximation, or determining the target lateral acceleration of the host vehicle using a cost function-based approach in which the lateral velocity field is used a reference velocity.

The method of the first aspect or any of its embodiments set out above may further comprise correcting the determined target lateral acceleration of the host vehicle using an indication of a local curvature of the road, such that the corrected target lateral acceleration of the host vehicle comprises a centripetal component which biases the autonomous control to cause the host vehicle to follow the local curvature of the road.

Additionally or alternatively, control signals may be generated for controlling steering and/or acceleration of the host vehicle to minimize a difference between a measured lateral acceleration of the host vehicle and the determined target lateral acceleration.

The present inventor has further devised, in accordance with a second aspect herein, a computer program comprising instructions, which, when executed by a computer processor, cause the computer processor to perform the method according to the first aspect. The computer program may be stored on a non-transitory computer-readable storage medium or carried by a signal.

The present inventor has further devised, in accordance with a third aspect herein, an apparatus arranged to determine a target lateral acceleration of a host vehicle relative to a road along which the host vehicle is travelling, for use in autonomous control of the host vehicle to be driven along the road in accordance with predetermined driving rules. The apparatus comprises an evaluation module arranged to evaluate each scalar velocity function of a plurality of scalar velocity functions at a plurality of key lateral positions predefined with respect to a model of the road to generate a respective set of scalar velocity values, wherein values of each scalar velocity function bias the autonomous control towards controlling the host vehicle to be driven along the road in accordance with a respective one of the driving rules. The apparatus further comprises a target lateral velocity generator module arranged to combine the scalar velocity values generated for each key lateral position of the plurality of key lateral positions to generate a respective target lateral velocity value for the key lateral position, the target lateral velocity generator module being arranged to combine the scalar velocity values generated for each of the key lateral positions by adding a first value, which is the greatest of zero and the scalar velocity values, to a second value, which is the smallest of zero and the scalar velocity values. The apparatus further comprises a lateral velocity field generator module, which is arranged to generate a lateral velocity field by interpolating between the target lateral velocity values generated for the plurality of key lateral positions, and a target lateral acceleration determination module, which is arranged to determine the target lateral acceleration of the host vehicle using the generated velocity field and a measured lateral velocity of the host vehicle.

The present inventor has further devised, in accordance with a fourth aspect herein, a vehicle comprising an automatic driver system arranged to autonomously control the vehicle to drive along a road in accordance with predetermined driving rules and using target lateral accelerations and an apparatus according to the third aspect, which is arranged to determine the target lateral accelerations.

BRIEF DESCRIPTION OF THE DRAWINGS

Embodiments of the disclosure will now be explained in detail, by way of non-limiting example only, with reference to the accompanying figures, described below. Like reference numerals appearing in different ones of the figures can denote identical or functionally similar elements, unless indicated otherwise.

DETAILED DESCRIPTION

Figure 1B:
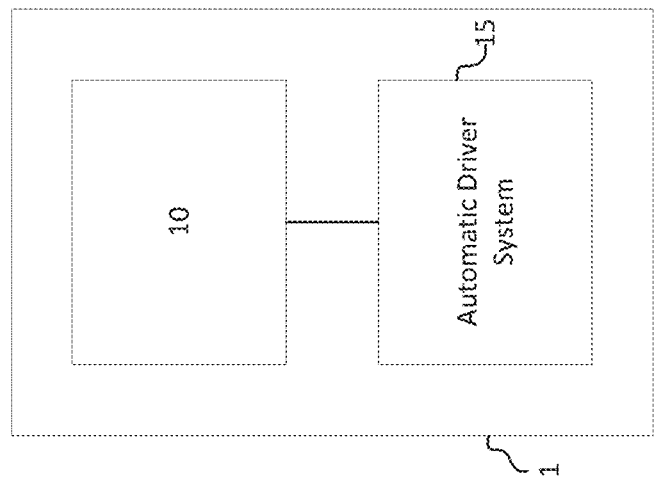
FIG. 1B is a schematic illustration of a vehicle, according to the example embodiment herein.

To be considered roadworthy, vehicles incorporating autonomous driving functionality are generally required to provide a high level of safety. While the safety's dependency on sensing equipment only can be proven with respect to likelihood, the algorithms used by autonomous driving systems for behavioral control and trajectory planning can be proven safe using formal models such as, Responsibility-Sensitive Safety (RSS), for example. RSS is a formal model describing allowed behavior to guarantee safety.

However, various difficulties can arise both in implementing autonomous driving systems such that the determined behaviors and trajectories of the host vehicle are safe and resemble human-like behavior (i.e. such that the autonomous control of the vehicle resembles the manual control performed by a safe human driver), and in formally proving the safety of autonomous driving systems, which may be overcome in order to provide roadworthy autonomous driving.

By way of example, while the RSS model may be sufficient to prove safety with respect to emergency maneuvers, it does not define conditions for safe behavior with respect to lanes of the road. In addition, the distances defined by the RSS model are based on expecting emergency maneuvers which, while safe, may not guarantee comfortable, human-like driving.

Furthermore, autonomous driving algorithms based on statistical models can lack transparency compared to rule-based models. Rule-based models allow a prediction of what will happen in any given situation, and a decision regarding actions that are consequently to be taken, to be linked to specific rules. In contrast, a crash caused by decision made by a statistical model (such as a machine learning model) may be harder to justify, and the causes may be more difficult or impossible to determine. The present inventor has recognized that, when generalizing to an arbitrary number of vehicles in the host vehicle's environment, the behavior in many conventional autonomous driving algorithms that are based on cost functions may have to be analyzed on a case-by case basis with respect to the number of vehicles and all possible constellations of these vehicles, in order to determine safety.

A rule-based approach for behavior and trajectory planning may involve determining a dynamic force field on the road as a function of the properties of the road and the objects on it, and using the dynamic force field to determine a trajectory of the host vehicle, as disclosed in the Master's Thesis of Oskar Larsson titled "The Oskillator, Artificial Force Field Highway Chauffeur" Chalmers University of Technology, Gothenburg, Sweden 2019 (https://hdl.handle-.net/20.500.12380/300733), the contents of which are incorporated herein in their entirety. This approach offers improved transparency relative to autonomous driving algorithms based on statistical models and takes into consideration the required behavior of a host vehicle with respect to lanes of road.

However, the present inventor has recognized that the lateral part of the dynamic force field approach described in the aforementioned Master's Thesis may result in unnaturally slow lane changes, and avoidance of the slow lane changes can result in abrupt movements of the host vehicle that are uncomfortable for a driver/passenger of the host vehicle and not sufficiently human-like. Furthermore, the present inventor has recognized that the use of the damped dynamic force field does not allow the autonomous driving algorithm to scale to higher "levels of priority" among various driving rules to be followed when autonomously controlling a host vehicle.

More particularly, the concept of using an overdamped piecewise linear force field to determine lateral acceleration functions poorly relative to the use of a similar field to determine longitudinal acceleration. This due to the small lateral distances moved in combination with the relatively high lateral velocities required when, for example, performing a lane switch. The overdamped piecewise linear force fields can act as velocity fields in that they approach an equilibrium without overshooting. In the approach defined in the aforementioned Master's Thesis, it is important that the field is overdamped to avoid oscillations around the equilibrium, which may cause a snaking motion of the host vehicle in its lane. However, in order for the system to remain overdamped, the damping coefficient may grow with the gradient of the field.

The present inventor has recognized that the components of the lateral force field may not be designed with a low enough gradient while also allowing the autonomous driving algorithm to scale to higher "levels of priority" among various driving rules to be followed and abrupt movements of the host vehicle that are uncomfortable for a driver/passenger of the host vehicle and not sufficiently human-like to be avoided, without significantly increasing the complexity of the force field and its components.

Example embodiments described in the following may address one or more of the issues outlined above and will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

Figure 1A:
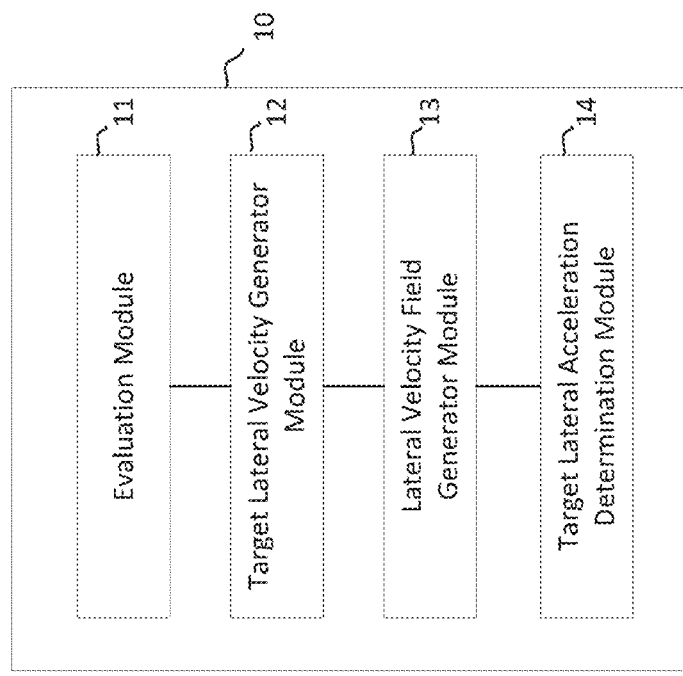
FIG. 1A is a schematic illustration of an apparatus arranged to determine a target lateral acceleration of a host vehicle, according to an example embodiment herein.

FIG. 1A is a schematic illustration of an apparatus 10 arranged to determine a target lateral acceleration of a host vehicle, according to an example embodiment herein.

The apparatus 10 is arranged to determine a target lateral acceleration of a host vehicle 1 (shown in FIG. 1B) relative to a road 20 (shown in FIG. 2A) along which the host vehicle 1 is travelling, for use in autonomous control of the host vehicle 1 to be driven along the road 20 in accordance with predetermined driving rules. That is, the determined target lateral acceleration of the host vehicle 1 is to be used in autonomous control of the host vehicle 1, for example, by autonomous driver system 15 shown in FIG. 1B. By way of example, the determined target lateral acceleration of the host vehicle 1 is to be used in autonomous control of the lateral acceleration of the host vehicle 1.

As shown in FIG. 1A, the apparatus 10 includes an evaluation module 11, a target lateral velocity generator module 12, a lateral velocity field generator module 13 and a target lateral acceleration determination module 14.

The evaluation module 11 is arranged to calculate, for each scalar velocity function of a plurality of scalar velocity functions, a respective set of scalar velocity values. The evaluation module 11 is arranged to calculate each scalar velocity value in the set by evaluating the scalar velocity function at a respective one of a plurality of key lateral positions 24_1 to 24_10 (shown in FIG. 2B) predefined with respect to a model of the road 20. Values of each scalar velocity function bias the autonomous control towards controlling the host vehicle 1 to be driven along the road 20 in accordance with a respective one of the driving rules.

Figure 2A:
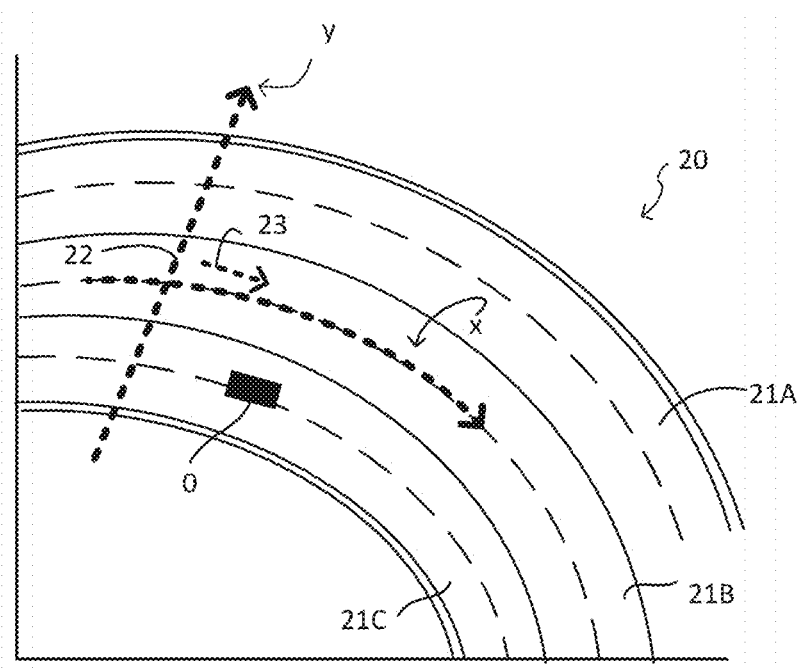
FIG. 2A illustrates a first example of a model of a road defined in a lane coordinate system.
Figure 2B:
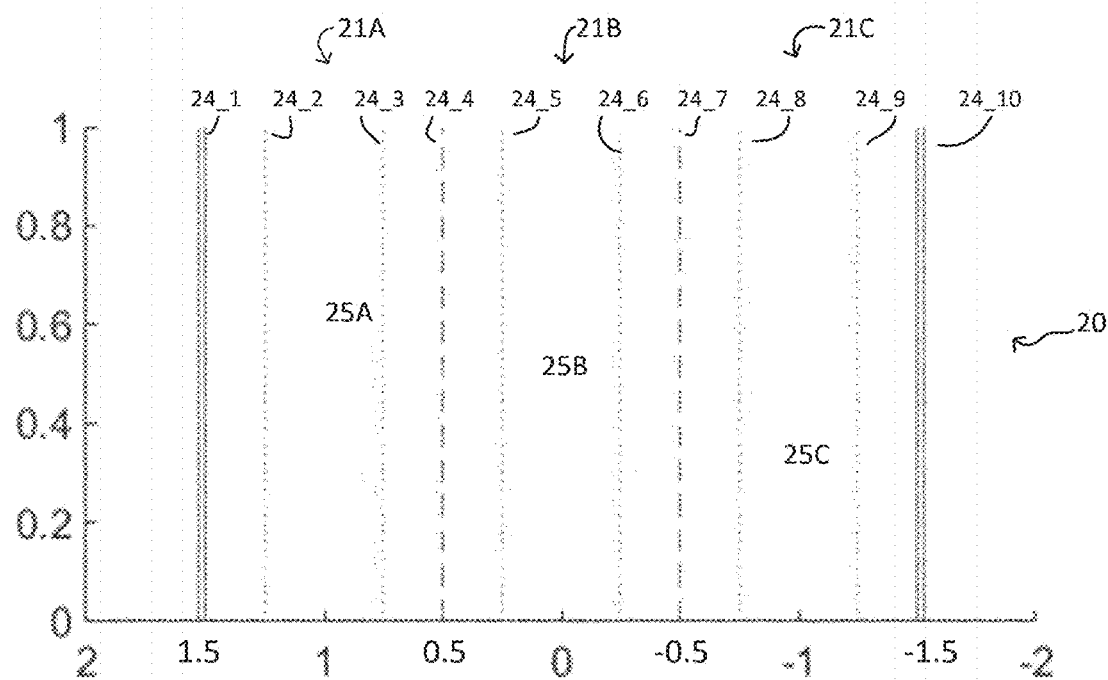
FIG. 2B illustrates a second example of a model of a road defined in a lane coordinate system.

FIGS. 2A and 2B illustrate an example of a model of a road 20 along which the host vehicle 1 may be controlled travel.

In the example of FIGS. 2A and 2B, the road 20 has three lanes 21A, 21B and 21C. The lanes of the road 20 may, as in the present example, have the same width. One of the lanes 21A, 21B, 21C may, as in the present example, serve as a so-called "fast lane" and another of the lanes 21A, 21B, 21C may serve as a so-called "slow lane". In the present example, the left most lane 21A serves as the fast lane and the rightmost lane 21C serves as the slow lane.

The exemplary model of the road 20 shown in FIGS. 2A and 2B illustrates the road 20 and the traffic thereon at a particular instant in time. In the exemplary model of the road 20, the host vehicle 1 is located at a position 22 in the middle lane 21B and travelling in the direction indicated by arrow 23. An object O (e.g. a vehicle of another road-user, that is a road user other than the host vehicle) is travelling in the right-most lane 21C in the same direction as the host vehicle 1.

The position of the host vehicle 1 and of object O in the model of the road 20 may, as in the present example, be defined with respect to a center of a bounding box of each vehicle. By way of alternative, the position of the host vehicle 1 and the object O may be defined in any suitable way such as, for example, a predetermined corner of the bounding box of each vehicle, a center of mass of each vehicle, a centroid of each vehicle, an average position of each vehicle, etc.

Although the model of the road 20 shown in FIGS. 2A and 2B has three lanes, the road 20 on which the model is based may have one lane, two lanes or four or more lanes and a corresponding number of lanes may be included in the model. By way of further alternative, while a single object O is shown in the model of the road 20 illustrated in FIG. 2A, any suitable number of objects may be included in a model of a road and, optionally, the number of objects may depend on the traffic on the road at a given time. By way of example, the number of objects may be determined from information from equipment such as radars, cameras, inertial measurement units etc., that collect data about the host vehicle and its environment in order to generate a high-level environment model describing the road and the traffic on it.

In the example of FIGS. 2A and 2B, the model of the road is defined in a lane coordinate system. The lane coordinate system may be a two-dimensional curvilinear coordinate system adapted to reflect the road 20 in which the model is to be based. In particular, a curvilinear coordinate system constituting the lane coordinate system has two axes, namely a longitudinal axis or x-axis (indicated by reference sign X in FIG. 2A) which extends in a longitudinal direction along the road and a lateral axis or y-axis (indicated by reference sign Y in FIG. 2B) which extends across the road. The x-axis is always parallel to the lanes of the road and the y-axis is orthogonal to the x-axis at every value of x.

In the example lane coordinate system shown in FIG. 2A, the x-axis of the lane coordinate system is increasing in the direction of forward travel of the host vehicle 1 and the y-axis of the lane coordinate system is increasing in the direction of the leftmost lane 21A of the road 20. This configuration is used by way of convenience. However, the lane coordinate system may be orientated in any suitable way. By way of example, the x-axis of the lane coordinate system may be increasing in a direction opposite to the direction of forward travel of the host vehicle 1 and/or the y-axis may be increasing in a direction of the rightmost lane of the road 20.

Furthermore, the lane coordinate system may, as in the example of FIGS. 2A and 2B, be defined such that x=0 denotes the position of the host vehicle in the x-axis and y=0 denotes the center of a lane of the road 20. In particular, the lane coordinate system may, as in the example of FIGS. 2A and 2B, be defined such that y=0 denotes the center of the center lane 21B. However, the lane coordinate system may be defined in any other suitable manner, e.g. y=0 may be selected denote the center of any lane among the plurality of lanes of the road 20.

FIG. 2B shows a graph illustrating the model of the road 20 of FIG. 2A viewed from position 22 at which the host vehicle 1 is located.

As shown in FIG. 2B, the y-axis may, as in the example of FIGS. 2A and 2B, be scaled to the lane width such that each increment or decrement of 1 in the y-axis represents the width of one lane, such that y=1 denotes the center of the leftmost lane 21A and y=−1 denotes the center of the rightmost lane 21C and y={−1.5, −0.5, 0.5, 1.5} denote the lane boundaries of lanes 21A, 21B and 21C. Alternatively, the y-axis may be scaled in any other suitable manner, e.g. such that each increment or decrement of 1 in the y-axis represents half the width of one lane so that both the lane centers and so lane boundaries have integer values or the y-axis may not be scaled.

The plurality of key lateral positions may correspond to a fixed set of discrete points (values of y) on the y-axis such that the scalar velocity functions may be evaluated only at the fixed set of discrete points (values of y) on the y-axis in order to determine the respective set of scalar velocity values. In example embodiments, such as the present example embodiment, in which the road has a plurality of lanes, the scalar velocity values of the calculated sets of scalar velocity values may, as in the present example embodiment, be calculated only in respect of the plurality of key lateral positions 24_1 to 24_10. The scalar velocity functions and the scalar velocity values are described in more detail below.

Each key lateral position 24_1 to 24_10 may, as in the present example embodiment, be a boundary of a lane 21A, 21B, 21C among the plurality of lanes, or an edge of a bias region 25A, 25B, 25C within a lane 21A, 21B, 21C among the plurality of lanes, the bias region 25A, 25B, 25C within each lane extending along the lane.

In the example shown in FIG. 2B, the key lateral positions 24_1 to 24_10 include both the boundaries of lanes 21A, 21B, 21C and the edges of bias regions 25A, 25B, 25C within the lanes 21A, 21B, 21C. In particular, key lateral positions 24_1, 24_4, 24_7 and 24_10 are each a boundary of the lanes 21A, 21B, 21C and key lateral positions 24_2, 24_3, 24_5, 24_6, 24_8, and 24_9 are each an edge of a bias region 25A, 25B, 25C within one of the lanes 21A, 21B, 21C.

Each bias region 25A, 25B, 25C may, as in the example shown in FIG. 2B, be defined by a lateral offset $\Delta y_{bias}$ from the center of the corresponding lane. The value of the lateral offset $\Delta y_{bias}$ may be selected so as to represent an acceptable deviation from the lane center (bias leeway) that a vehicle may have while still being considered to remain fully (safely) within the lane. In particular, in order to ensure safety, the host vehicle 1 may stay near the center of a lane in which is travelling unless the host vehicle 1 is switching lanes and the lateral offset $\Delta y_{bias}$ may be selected so as to represent the maximal lateral deviation from a center of the lane the host vehicle 1 may appropriately have when not switching lanes.

In example embodiments like the present example embodiment, in which the y-axis is scaled to the lane width such that each increment or decrement of 1 in the y-axis represents the width of one lane and the key lateral positions 24_1 to 24_10 include both the boundaries of the lanes and the edges of the bias regions, the plurality of key lateral positions $Y_{key}$ may be formally defined as follows:

$$Y_b = \{y_b | y_b = i + 0.5 \text{ for } i \in \mathbb{Z}\} \quad (1)$$

$$Y_{left} = \{y_{left} | y_{left} = i + \Delta y_{bias} \text{ for } i \in \mathbb{Z}\} \quad (2)$$

$$Y_{right} = \{y_{right} | y_{right} = i + \Delta y_{bias} \text{ for } i \in \mathbb{Z}\} \quad (3)$$

$$Y_{key} = Y_b \cup Y_{left} \cup Y_{right} \quad (4)$$

In example embodiments in which the y-axis is not scaled to the lane width such that each increment or decrement of 1 in the y-axis represents the width of one lane, i may not be an element of $\mathbb{Z}$ and the value of 0.5 in equation (1) above may be replaced with a value in the y-axis corresponding to half the width of one lane of the road.

In the example of FIGS. 2A and 2B, the model of the road 20 is defined in a lane coordinate system. However, the model of the road 20 may be defined by any other suitable means, such as a grid model or using a Cartesian coordinate system or any other suitable coordinate system. More generally, the model of the road 20 may be defined in any suitable way such that the apparatus 10 is provided with information on the position of the host vehicle 1, the curvature of the road 20, the number and width of lanes 21A, 21B, 21C and the position and velocity of any other object on the road.

Referring again to FIG. 1A, the target lateral velocity generator module 12 is arranged to combine the scalar velocity values calculated for each key lateral position 24_1 to 24_10 of the plurality of key lateral positions to generate a respective target lateral velocity value for the key lateral position 24_1 to 24_10. The target lateral evaluation module is arranged to combine the scalar velocity values calculated for each of the key lateral positions 24_1 to 24_10 by adding a first value, which is the greatest of zero and the scalar velocity values, to a second value, which is the smallest of zero and the scalar velocity values.

The lateral velocity field generator module 13 is arranged to generate a lateral velocity field by interpolating between the target lateral velocity values generated for the plurality of key lateral positions 24_1 to 24_10.

The target lateral acceleration determination module 14 is arranged to determine the target lateral acceleration of the host vehicle 1 using the generated velocity field and a measured lateral velocity of the host vehicle 1.

The apparatus 10 may obtain the measured lateral velocity of the host vehicle 1 by any suitable means known to those versed in the art. By way of an example, the apparatus 10 may be provided with one or more sensors for measuring the lateral velocity of the host vehicle 1. Alternatively, the apparatus 10 may be configured to receive the measured lateral velocity of the host vehicle 1 from any other system provided in the host vehicle 1 or to receive the measured lateral velocity of the host vehicle 1 from an entity external to the host vehicle 1.

FIG. 1B is a schematic illustration of a (host) vehicle 1, according to an example embodiment herein. The vehicle 1 includes an automatic driver system 15, which is arranged to autonomously control the vehicle 1 to drive along a road 20 in accordance with predetermined driving rules and using target lateral accelerations. The vehicle 1 also includes the apparatus 10, which is arranged to determine the target lateral accelerations.

The combination of the automatic driver system 15 and the apparatus 10 may be referred to as an autonomous driving system, i.e. one capable of performing behavior and trajectory planning and subsequent control of the host vehicle.

In the example embodiment shown in FIG. 1B, the apparatus 10 and the automatic driver system 15 are illustrated as separate devices. The functionalities of the apparatus 10 and the automatic driver system 15 may alternatively be provided by an appropriately configured single device, e.g. an appropriately programmed computer processor.

Figure 3:
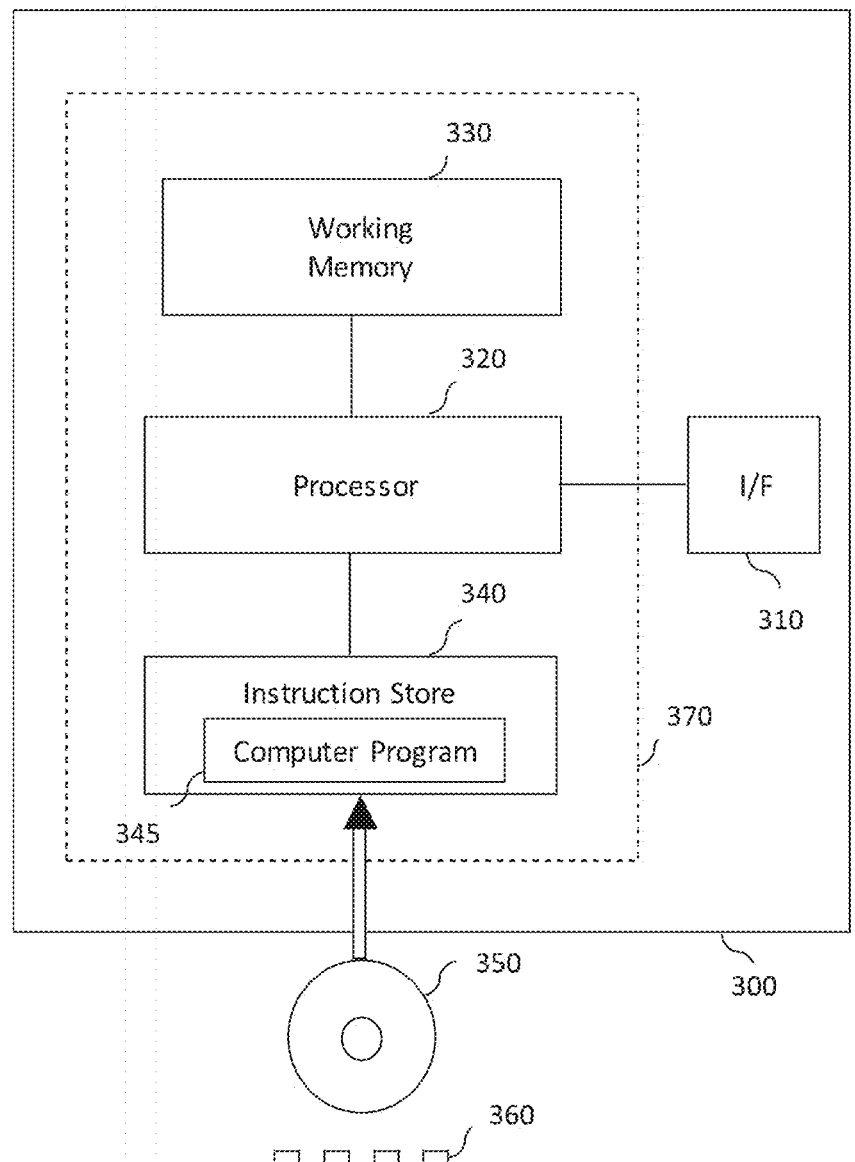
FIG. 3 is a block diagram illustrating an example implementation of the apparatus of the example embodiment in programmable signal processing hardware.

FIG. 3 is a schematic illustration of programmable signal processing apparatus 300, which may be configured to implement the functionality of the apparatus 10. The signal processing apparatus 300 includes an interface module 310 for receiving information and data about the host vehicle and its environment. The signal processing apparatus 300 further includes a processor (CPU) 320 for controlling the apparatus 10, a working memory 330 (e.g. a random-access memory) and an instruction store 340 storing a computer program comprising computer-readable instructions which, when executed by the processor 320, cause the processor 320 to perform the processing operations of the apparatus 10. The instruction store 340 may include a ROM (e.g. in the form of an electrically erasable programmable read-only memory (EEPROM) or flash memory) which is pre-loaded with the computer-readable instructions. Alternatively, the instruction store 340 may include a RAM or similar type of memory, and the computer-readable instructions can be input thereto from a computer program product, such as a computer-readable storage medium 350 such as a CD-ROM, etc. or a computer-readable signal 360 carrying the computer-readable instructions.

In the present example embodiment, the combination 370 of the hardware components shown in FIG. 3, comprising the processor 320, the working memory 330 and the instruction store 340, is configured to implement the functionality of each of the component modules of the apparatus 10 shown in FIG. 1A.

Figure 4:
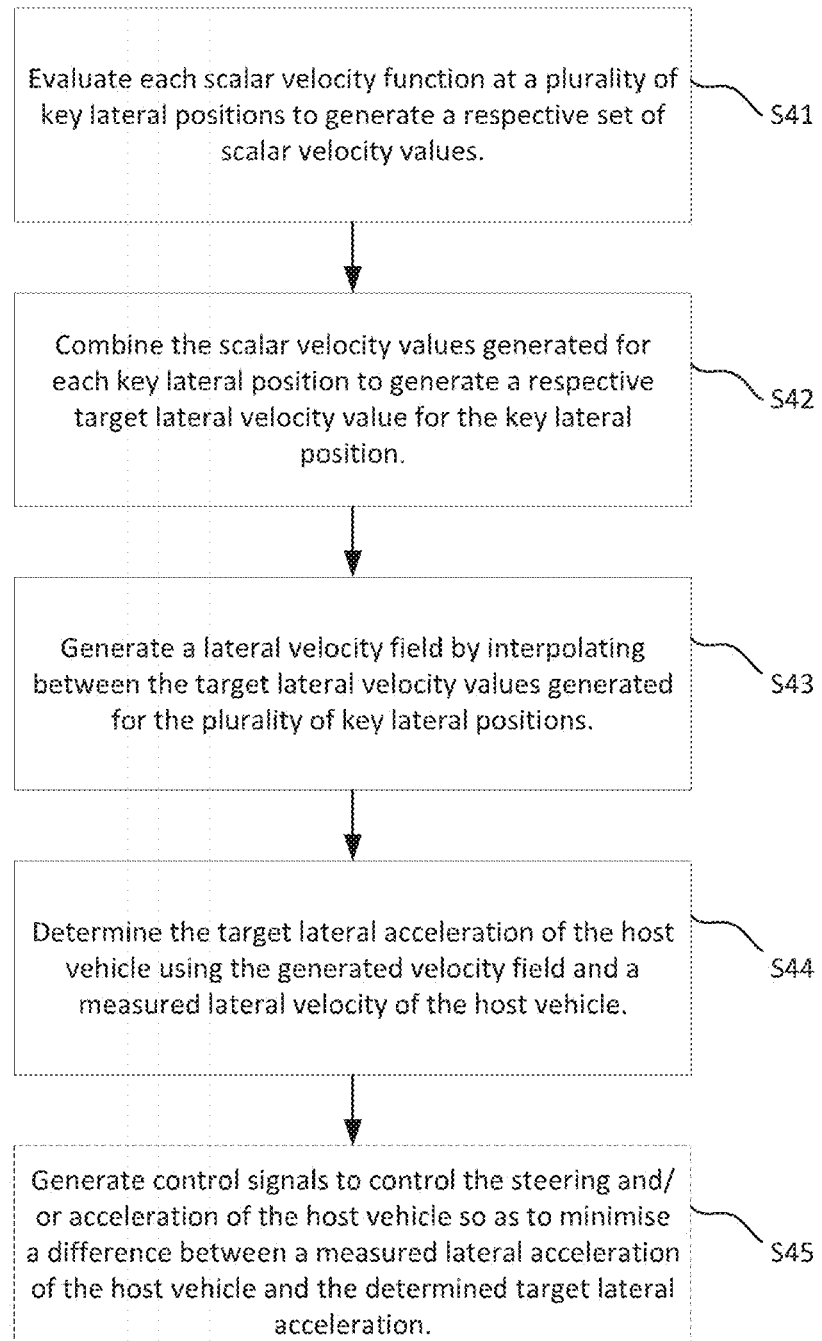
FIG. 4 is a flow diagram illustrating a process by which the apparatus of the example embodiment determines a target lateral acceleration of a host vehicle.

FIG. 4 is a flow diagram illustrating a process by which the apparatus 10 of FIG. 1A determines a target lateral acceleration of a host vehicle 1 relative to a road 20 along which the host vehicle 1 is travelling, for use in autonomous control of the host vehicle 1 to be driven along the road 20 in accordance with predetermined driving rules.

That is, target lateral acceleration of the host vehicle 1 determined in accordance with the process of FIG. 4 is to be used in autonomous control of the host vehicle 1, for example, by autonomous driver system 15 shown in FIG. 1B. By way of example, the determined target lateral acceleration of the host vehicle 1 is to be used in autonomous control of the lateral acceleration of the host vehicle 1.

The predetermined driving rules, which are discussed in more detail below, are generally based on desired behaviors of the host vehicle 1 in various traffic situations which ensure that the movement of the host vehicle 1 under the autonomous control is safe and/or in line with the expected behavior of human driver, for example. In particular, the predetermined driving rules may, as in the present example embodiment, specify lateral movements of the host vehicle 1, both within the lane and during lane changing, which may occur in response to a prevailing traffic situation (e.g. when the host vehicle 1 is approaching a slower-moving vehicle in its lane, when the host vehicle is overtaking another vehicle, etc.). The target lateral acceleration determined in accordance with the process of FIG. 4 may be such that autonomous control of the host vehicle 1 based on the determined target lateral acceleration exhibits human-like behavior.

By way of example, the following are examples of human-like behaviors which the autonomously driven host vehicle 1 may exhibit so as to resemble a vehicle driven by a safe and responsible human driver:

The host vehicle 1 may follow the road 20 when travelling within a particular lane 21B (the current lane), i.e. the direction of travel of the host vehicle 1 as indicated by arrow 23 in FIG. 2A may be parallel or substantially parallel the lanes 21A, 21B, 21C.

The host vehicle 1 may avoid objects within the current lane 21B.

The host vehicle 1 may not make illegal turn endangering other drivers even if someone enters the current lane 21B dangerously.

The host vehicle 1 may only switch into a slower lane 21C if there are no other objects in that lane.

The host vehicle 1 may switch into a faster lane 21A if there are no objects in the faster lane 21A and if an object travelling in front of the host vehicle 1 in the current lane 21B is moving slowly (slow leading vehicle).

The host vehicle 1 may remain in the current lane 21B if there is a slow leading vehicle and there are one or more objects in the faster lane 21A (obstructed fast lane).

The host vehicle 1 may remain in the current lane 21B if there is a slow leading vehicle but switching lanes may cause an obstruction in the other lane 21A, 21C into which the host vehicle 1 may move.

The host vehicle 1 may remain in the current lane 21B if there is a slow leading vehicle but the current lane is prioritized, e.g. in light of the intended route of the host vehicle 1 such as where only vehicles in a particular lane may make a turn or take an exit.

The host vehicle 1 may switch into another lane 21A, 21C, if it is safe to do so and if there is an obstruction in the current lane 21B.

The host vehicle 1 may never cause a danger to a third party even if a vehicle of a second party behaves unsafely.

The predetermined driving rules may specify lateral movements of the host vehicle 1 that are necessary for the host vehicle 1 to exhibit one or more of the above human-like behaviors. By way of example, the predetermined driving rules may be one or more of the following:

Tend towards the center of the lane, do not go more than the bias leeway from the center of the lane.

Switch towards a weakly preferred lane.

Switch towards the fast lane with a slow leading vehicle.

Switch towards/Do not leave a strongly preferred lane.

Do not switch towards an occupied lane with unsafe longitudinal distance to another vehicle.

As will be discussed in more detail below, the target lateral acceleration determined in accordance with the process of FIG. 4 may be determined such that autonomous control of the host vehicle 1 based on the determined target lateral acceleration will result in the host vehicle 1 following the predetermined driving rules.

In process step S41 of FIG. 4, the evaluation module 11 evaluates each scalar velocity function of a plurality of scalar velocity functions at a plurality of key lateral positions 24_1 to 24_10 predefined with respect to a model of the road 20 to generate a respective set of scalar velocity values. Values of each scalar velocity function bias the autonomous control towards controlling the host vehicle 1 to be driven along the road 20 in accordance with a respective one of the driving rules. In other words, the value of each scalar velocity function indicates a priority according to which the autonomous control controls the host vehicle 1 in accordance with the respective one of the driving rules. The values of the scalar velocity functions thus bias the autonomous control so that the host vehicle 1 follows the different driving rules to varying degrees, depending on the priorities indicated by the associated velocity function values.

For example, the plurality of scalar velocity functions may include two or more scalar velocity functions such that two or more scalar velocity functions are evaluated at each of the key lateral positions 24_1 to 24_10. By way of a specific example, the plurality of scalar velocity functions may include four scalar velocity functions such that the evaluation module 11 calculates four scalar velocity values for each individual key lateral position 24_1 to 24_10 by evaluating each of the four scalar velocity functions at that key lateral position. The plurality of key lateral positions 24_1 to 24_10 may be any of the key lateral positions 24_1 to 24_10 discussed above in relation to FIG. 2B.

Each of the scalar velocity functions may, as in the present example embodiment, map a set of one or more input parameters or variables to a single output value, where the output value is a scalar value representing a priority level, which is used to generate a resulting intention by the composition process described herein, and subsequently a suitable velocity, depending on where the function was evaluated to generate the scalar output value (e.g. a boundary or an edge of the bias region).

For each of the scalar velocity functions, the set of one or more input parameters or variables may relate to the environment of the host vehicle 1 such as, for example, one or more of a characteristic of the road 20 on which the host vehicle 1 is travelling, the lane 21B in which the host vehicle 1 is travelling, a predefined route of the host vehicle 1, and a relative position and velocity of at least one object O (e.g. another vehicle) in the environment of the host vehicle 1. As such, the values of the set of one or more input parameters of each of the scalar velocity functions may vary over time and with the varying position of the host vehicle 1 along the road.

Values of each scalar velocity function may, as in the present example embodiment, bias the autonomous control towards controlling the host vehicle 1 to be driven along the road 20 in accordance with a respective one of the driving rules, in that a magnitude or other characteristic of the scalar velocity value resulting from evaluating a particular scalar velocity function at a particular key lateral position 24_1 to 24_10 may be indicative of a priority with which an action (i.e. a lateral movement of the host vehicle 1) according to a respective one of the driving rules is to be taken. By way of example, the action may be one of a sequence of actions comprising movements of the host vehicle 1 along the y-axis of the lane coordinate system that cause the host vehicle 1 to remain within the bias leeway of a lane. In another example, the action may be a movement across a key lateral position. In this case, the priority (or importance) indicated by the magnitude or other characteristic of the scalar velocity value may be higher than a certain threshold (e.g. 0.5) so that this action takes priority over other actions and causes a lateral movement of the host vehicle 1 across the key lateral position (which may occur in lane switch). As described in more detail below, such a threshold may be implemented by the inclusion of a lane-following scalar velocity function.

Additionally or alternatively, a magnitude or other characteristic of the scalar velocity value resulting from evaluating a particular scalar velocity function at a particular key lateral position 24_1 to 24_10 may be indicative of a direction in which the host vehicle 1 may move, a velocity with which the host vehicle 1 may move in a particular direction or acceleration with which the host vehicle 1 may move in a particular direction in order to comply with a respective one of the driving rules.

The scalar velocity functions may, as in the present example embodiment, include a lane-following velocity function, which biases the autonomous control towards controlling the host vehicle 1 to remain within a lane of the plurality of lanes 21A, 21B, 21C. In this case, the process of FIG. 4 may have a process step in which the evaluation module 11 calculates, for each of the plurality of key lateral positions 24_1 to 24_10, a respective lane-following scalar velocity value of the lane-following velocity function. That is, the lane-following velocity function is a scalar velocity function which is configured to cause the host vehicle 1 to steer towards the center of the current lane 21B.

By way of example, the lane-following scalar velocity function $v_{lane}$ may be formally defined as follows, where $y_{key}$ is a key lateral position among the plurality of key lateral positions $Y_{key}$ defined in equation (4):

$$v_{lane}(y_{key}) = \begin{cases} 0, & \text{for } y_{key} \in Y_b \\ -0.5, & \text{for } y_{key} \in Y_{left} \\ 0.5, & \text{for } y_{key} \in Y_{right} \end{cases} \quad (5)$$

In the exemplary definition of the lane-following scalar velocity function $v_{lane}$, 0.5 is a scalar value $A_{lane}$ representing the maximum magnitude of the lane-following scalar velocity function $v_{lane}$. Alternatively, $A_{lane}$ may be any other suitable scalar value, as will be discussed in more detail below.

Figure 5:
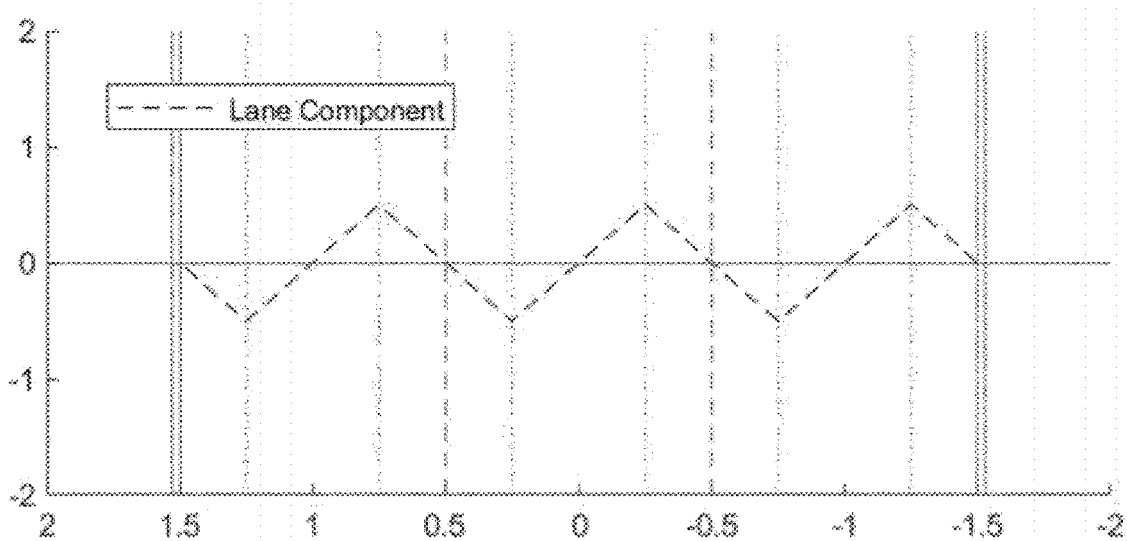
FIG. 5 is a graph illustrating a distribution of values of a lane-following scalar velocity function across the model road shown in FIGS. 2A and 2B.

FIG. 5 is a graph illustrating a distribution of the values of the lane-following scalar velocity function $v_{lane}$ across the road 20 shown in FIGS. 2A and 2B. It is noted that the lane-following velocity function $v_{lane}$ is only evaluated at the key lateral positions 24_1 to 24_10. As such, the linear interpolation shown in FIG. 5 between the respective lane-following scalar velocity values calculated in respect of each of the plurality of key lateral positions is for ease of visualization only.

The scalar velocity functions (not including the optional lane-following scalar velocity function) may, as in the present example embodiment, be categorized as object scalar velocity functions for which the calculated scalar velocity value for a given key lateral position 24_1 to 24_10 is calculated in respect of each object (other vehicle/road user) in the environment of the host vehicle 1, and preference scalar velocity functions that are independent of road traffic and depend on the intended route of the host vehicle 1.

By way of example, in some example embodiments, such as the present example embodiment, in which the road has a plurality of lanes, the plurality of scalar velocity functions may, as in the present example embodiment, include at least one of:
(i) a weak preference function;
(ii) a strong preference function;
(iii) an overtaking function; and
(iv) a no-cut function.

The weak preference function biases the autonomous control to lead the host vehicle 1 towards a default lane among the plurality of lanes 21A, 21B, 21C.

The weak preference function may be independent of the traffic on the road and provide a default behavior of returning to the slow lane or other default lane among the plurality of lanes 21A, 21B, 21C. By way of example, the weak preference function may be configured so as to bias autonomous control to lead the host vehicle 1 to return to the slow lane 21C after passing another vehicle.

By way of example, the weak preference function $v_{weak}$ may be formally defined as follows:

$$v_{weak}(y_{key}) = \begin{cases} A_{weak} = \text{for } y_{key} \leq i_{weak} \\ -A_{weak} = \text{for } y_{key} > i_{weak} \end{cases}, \quad (6)$$

where $i_{weak}$ the lateral coordinate of the default lane among the plurality of lanes 21A, 21B, 21C. In example embodiments such as the present example embodiment, in which the y-axis is scaled to the lane width such that each increment or decrement of 1 in the y-axis represents the width of one lane, $i_{weak}$ may, as in the present example embodiment, be a real number ($i_{weak} \in \mathbb{Z}$). $A_{weak}$ is a scalar value. For example, in the present example embodiment, $A_{weak}=1$.

Figure 6:
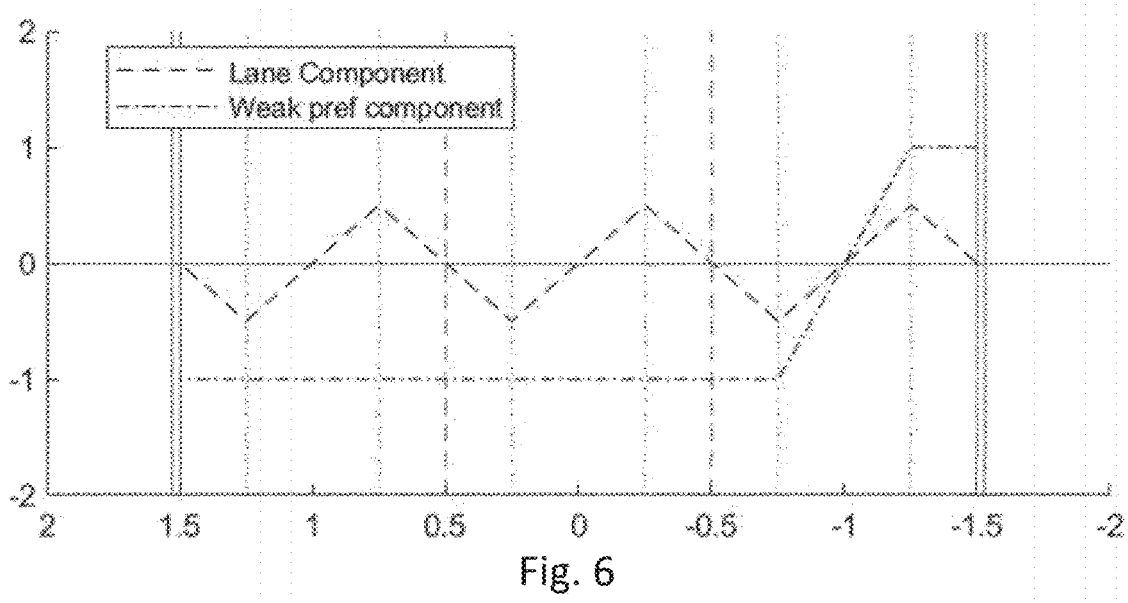
FIG. 6 is a graph illustrating a distribution of values of a weak preference function across the model road shown in FIGS. 2A and 2B.

FIG. 6 is a graph illustrating a distribution of the values of the weak preference function $v_{weak}$ across the road 20 shown in FIGS. 2A and 2B. It is noted that the weak preference function $v_{weak}$ is only evaluated at the key lateral positions 24_1 to 24_10. As such, the linear interpolation shown in FIG. 6 between the respective weak preference values calculated in respect of each of the plurality of key lateral positions is for ease of visualization only.

The strong preference function biases the autonomous control to lead the host vehicle 1 towards a preferred lane among the plurality of lanes 21A, 21B, 21C when the host vehicle is not in the preferred lane, and prevent the host vehicle 1 from leaving the preferred lane when the host vehicle 1 is in the preferred lane. Additionally, the strong preference function may be further configured to provide a default behavior to the host vehicle 1 of avoiding going past some outer lane 21A, 21C of the road 20.

By way of example, the strong preference function may depend on the route input and may bias the autonomous control to lead the host vehicle 1 towards the preferred lane, even if it means slowing down to follow a slower vehicle. For example, when the road forks ahead of the host vehicle 1, the left (slow) lane may be preferred, and autonomous control may be performed such that the host vehicle 1 does not switch lanes out of the left lane under any circumstances. The strong preference function may also bias the autonomous control to prevent the host vehicle 1 from leaving the lanes 21A, 21B, 21C under all circumstances.

By way of an example, the strong preference function $v_{strong}$ may be defined as follow:

$$v_{strong}(y_{key}) = \begin{cases} A_{strong} = \text{for } y_{key} \leq \min I_{strong} \\ -A_{strong} = \text{for } y_{key} > \max I_{strong} \end{cases}, \quad (7)$$

where $I_{strong}$ are the set of one or more preferred lanes among the plurality of lanes 21A, 21B, 21C. In example embodiments such as the present example embodiment, in which the y-axis is scaled to the lane width such that each increment or decrement of 1 in the y-axis represents the width of one lane, $I_{strong}$ may, as in the present example embodiment, be a set of real numbers ($I_{strong} \subset \mathbb{Z}$). $A_{strong}$ is a scalar value. For example, in the present example embodiment, $A_{strong}$ equals 3.

Figure 7:
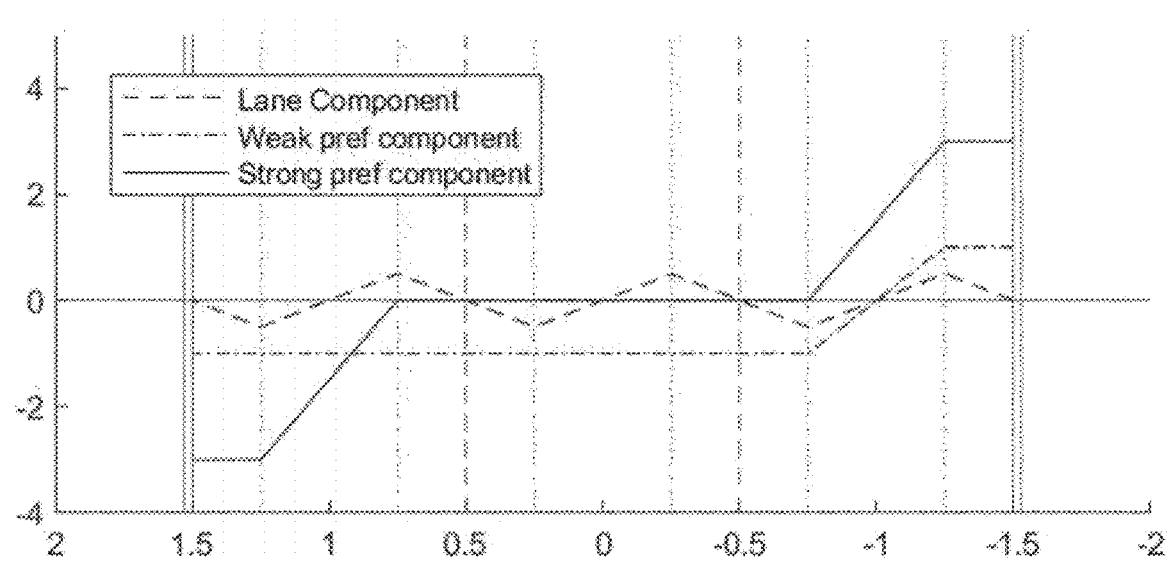
FIG. 7 is a graph illustrating a distribution of values of a strong preference function across the model road shown in FIGS. 2A and 2B.

FIG. 7 is a graph illustrating a distribution of the values of the strong preference function $v_{strong}$ across road 20 shown in FIGS. 2A and 2B. It is noted that the strong preference function $v_{strong}$ is only evaluated at the key lateral positions 24_1 to 24_10 and, as such, the linear interpolation shown in FIG. 7 between the respective strong preference values calculated in respect of each of the plurality of key lateral positions is for ease of visualization only.

The overtaking (pass) function biases the autonomous control to lead the host vehicle 1 towards a faster lane 21A among the plurality of lanes 21A, 21B, 21C in a case where the host vehicle 1 is approaching a slower-moving vehicle.

The no-cut function biases the autonomous control to prevent the host vehicle 1 from moving into a lane of a vehicle being overtaken by the host vehicle 1 in a case where a distance along the road 20 between the host vehicle 1 and the vehicle being overtaken is less than a threshold distance.

The overtaking (pass) function and/or the no-cut function may, as in the present example embodiment, be evaluated at each of the plurality of key lateral positions 24_1 to 24_10 for each object in the environment of the host vehicle 1.

By way of example, the overtaking function and/or the no-cut function may be determined based on a state of the host vehicle 1 and a state of at least one other object O on the road 20 in the environment of the host vehicle 1, such that the value obtained by evaluating the overtaking function at a particular key lateral position 24_1 to 24_10 is based on other road users in the host vehicle's environment.

For example, the state of the host vehicle 1 may include information regarding the host vehicle 1 including, by way of example, at least one of: a lateral position of the host vehicle 1, a longitudinal velocity of the host vehicle 1, a lateral velocity of the host vehicle 1, and a desired longitudinal velocity 1. Additionally or alternatively, the state of the object O may include information regarding the object O, including, by way of example, at least one of a longitudinal position of the object, a lateral position of the object, a longitudinal velocity of the object, a lateral velocity of the object, and a longitudinal acceleration of the object.

By way of example, the overtaking function $v_{pass}$ and the no-cut function $v_{no-cut}$ may be formally defined as follows.

The evaluation module 11 may be provided with information about the host vehicle 1 in the form of a host state H which is the set of the following properties:
y—lateral position
$v_x$—longitudinal velocity
$v_y$—lateral velocity
$v_{des}$—desired longitudinal velocity Similarly, the evaluation module 11 may be provided with information about the object in the form of an object state $O_i$ for each object i which is the set of the following properties:
$x_i$—longitudinal position (center of bounding box)
$y_i$—lateral position (center of bounding box)
$v_{x,i}$—longitudinal velocity
$v_{y,i}$—lateral velocity
$a_{x,i}$—longitudinal acceleration
$l_{x,i}$—longitudinal extent of object The host state H and the object state $O_i$ of each object i may be used to define some intermediate values as part of defining the pass component $v_{pass}$ and/or the no-cut function $v_{no-cut}$. In particular, a rectangular area around each object i may be defined relative to the model of the road 20 (for example, in the lane coordinate system of the present example embodiment) representing a region of "full effect" of the overtaking function $v_{pass}$ and/or the no-cut function $v_{no-cut}$, where these functions has some full amplitude. Outside the region of full effect, the overtaking function $v_{pass}$ and/or the no-cut function $v_{no-cut}$ linearly drops to zero with a certain ramping distance so as to have a truncated pyramid shape.

By providing a ramping distance in this way, it becomes possible to ensure smooth movement of the host vehicle as other road users move about on the road 20. In particular, the ramping distance may allow that the values of the generated overtaking values and no-cut values, and thus the effect of object O on the autonomous control of the host vehicle 1, to gradually increase as the object O moves relative to the road 20 or a lane thereon. As such, the overtaking function $v_{pass}$ may allow the host vehicle 1 to completely switch into the fast lane, and to remain within the bias region of that lane. Similarly, the no-cut function $v_{no-cut}$ can prohibit the host vehicle 1 from leaving the bias region towards an occupied lane. The range will also reach one lane further if the object O is approaching a lane boundary. In this way, the no-cut function $v_{no-cut}$ can allow the host vehicle to avoid making a dangerous simultaneous lane switch into a lane into which the object O is moving.

Figure 8:
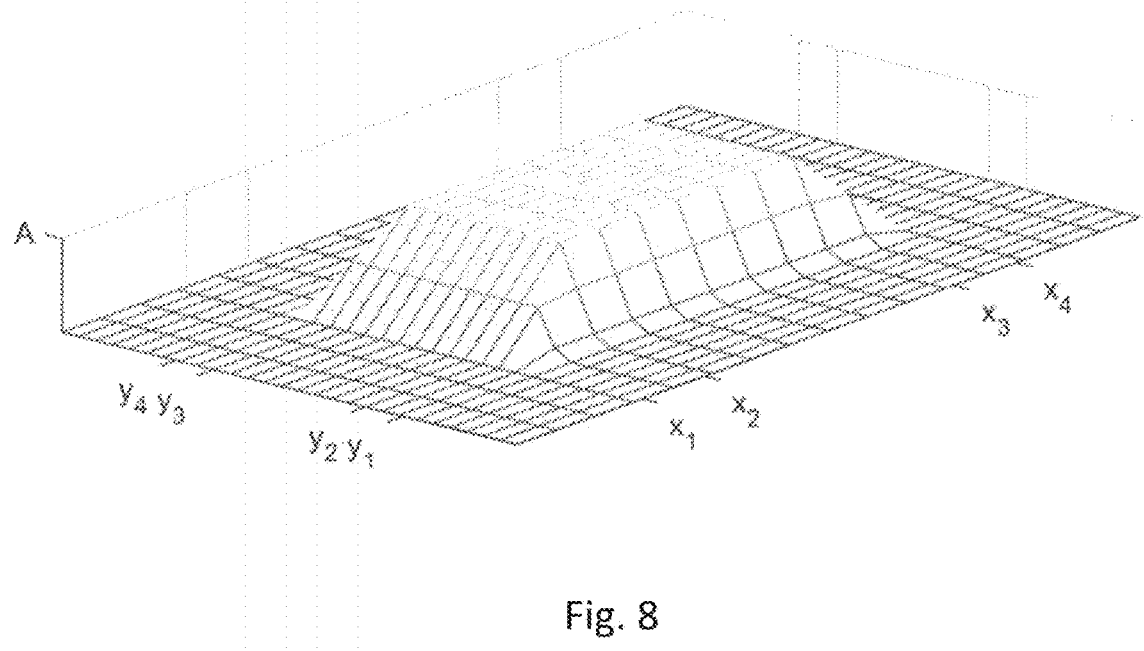
FIG. 8 is a plot illustrating an exemplary region of full effect having a truncated pyramid shape for a given object.

FIG. 8 is a plot illustrating an exemplary region of full effect having a truncated pyramid shape for a given object O. The lateral and longitudinal range functions are defined so as to provide a rectangular region of full effect, with linear decrease to zero on the edges.

The regions and the ramping distances are defined using certain longitudinal and lateral ranges. The lateral ranges depend only on the lateral position $y_i$ and velocity $v_i$ of the object O itself, whilst the longitudinal ranges also depend on the longitudinal velocity $v_x$ of the host vehicle 1. Defining the lateral range and the longitudinal range for each object O further includes defining the following functions:

$$\text{clip}(x,a,b) = \min(\max(a,x),b) \tag{8}$$

$$\text{trapezoid}(x,a,b) = \text{clip}((1-(x-a)/(b-a)),0,1) \tag{9}$$

The following equations (10) to (12) show how the value v at each point (x, y) is calculated using the above clip and trapezoid functions to create a scaling having a pyramid shape:

$$k_x = \min(\text{trapezoid}(-x, x_2, x_1), \text{trapezoid}(x, x_3, x_4)) \tag{10}$$

$$k_y = \min(\text{trapezoid}(-y, y_2, y_1), \text{trapezoid}(y, y_3, y_4)) \tag{11}$$

$$v = A\min(k_x, k_y) \tag{12}$$

$$\tag{13}$$

$$\text{interp}([x_1, x_2 \ldots x_n], [y_1, y_2 \ldots y_n], x) = \begin{cases} y_1, & x \leq x_1 \\ y_k + a(y_{k+1} - y_k), & x_k \leq x \leq x_{k+1} \\ a = \dfrac{x - x_k}{x_{k+1} - x_k} \\ y_n, & x \geq x_n \end{cases}$$

A lateral range function $\Delta y_{range}(y, v)$ is used to determine the lateral extent of the region of full effect for each object O where y is the lateral position of object O and v is the lateral velocity of object O. The lateral range for each object O is defined to extend into a lane adjacent to the lane in which the object O is located, far enough to encompass the closest edge of the bias region of that adjacent lane, which is a key lateral position 24_1 to 24_10. Furthermore, the lateral range function may be defined such that the region of full effect for the no-cut component reaches past the next lane of an object performing a lane switch such that the host vehicle 1 is prohibited from performing a simultaneous lane switch.

In the following definitions, it is assumed that the y-axis is scaled to the lane width such that each increment or decrement of 1 in the y-axis represents the width of one lane, as in the present example embodiment, such that the value of 0.5 may represent the half the width of a lane of the road 20 (i.e. a distance between a center of a lane and a boundary thereof). Alternatively, in example embodiments in which the y-axis is not so scaled, the value of 0.5 in sets (i) and (ii) and equations (14) to (26) may be replaced with any suitable value corresponding to half of the width of a lane of the road 20 and other values (e.g. 1.5, 1, etc.) may be scaled accordingly.

The left lateral range is then given by the lateral range function $\Delta y_{range}(y, v)$, which may be defined as follows:

$$ys = [-0.5, -\Delta y_{bias}, \Delta y_{bias}, 0.5] \quad (i)$$

$$rs = [1.5 - \Delta y_{bias}, 1, 1 - \Delta y_{bias}, 1.5 - \Delta y_{bias}] \quad (ii)$$

$$\Delta y_{base}(y) = interp(ys, rs, \tilde{y}), \quad (14)$$

where $\tilde{y} \in [-0.5, 0.5)$ and $\tilde{y} = (y + 0.5 \bmod 1) - 0.5$ $$\Delta y_{v,range}(y, v) = \quad (15)$$
$$interp([0, \Delta y_{bias}, 0.5], [0, 1 - \Delta y_{bias}, 0], \tilde{y}) \operatorname{clip}\left(\frac{v - v_\mu}{v_{min,switch} - v_\mu}, 0, 1\right)$$

$$\Delta y_{range}(y, v) = \Delta y_{base}(y) + \Delta y_{v,range}(y, v) \quad (16)$$

The right lateral range is calculated by symmetry as $\Delta y_{range}(-y, -v)$.

In equation (15) above, $v_\mu$ is a threshold velocity (e.g. the peak lateral velocity to be used for setting an offset in the lateral position of the vehicle relative to a center of a lane while driving within the lane (this setting of the offset being referred to herein as "biasing")) below which the lateral range does not increase in order to avoid an increase of the lateral range being caused by small oscillations of the object O which may in turn result in uncomfortable behavior and $v_{min,switch}$ is a minimum lateral velocity to be used during lane switching or that is indicative of lane switching. By calculating the left and right lateral ranges separately, it can be ensured that lateral range is only increased on the side of the lane in the direction of the velocity.

The longitudinal range for each object O is defined using a set of longitudinal distances such as safety distances and comfortable equalizing distances, namely $d_{ramp}$, $d_{pass}$, $d_{safe,f}$, $d_{safe,b}$, $d_{comf,eq}$, $d_{cut,f}$ and $d_{cut,b}$ as described below. These are all dependent on the longitudinal velocities of both the object O and the host vehicle 1.

$d_{ramp}$ the ramping distance, the distance which the components ramp from 0 to their maximum value. Dependent on the following parameters:
   $s_{min}$—Minimum ramping distance (m).
   $t_{ramp}$—Minimum ramping time (s).
$d_{pass}$—the passing distance of full effect for the pass component. Far enough to complete lane switch before having to slow down. Dependent on the following parameters:

$t_{trail}$ headway distance (s).
$t_{switch}$—Time to complete lane switch (s).
$t_a$—Predicted time to keep current acceleration (s).
$d_{safe,f}$—the safety distance in front of other vehicles. Dependent on the following parameters:
   $t_{o,r}$—Other road-user reaction time (s).
   $b_{max}$—Host maximum braking deceleration (ms$^{-2}$).
   $b_{o,min}$—Other road-user minimum emergency braking response (ms$^{-2}$).
$d_{safe,b}$—the safety distance behind other vehicles. Dependent on the following parameters:
   $t_r$—Host reaction (adaptation) time (s).
   $b_{o,max}$—Other road-user maximum braking deceleration (ms$^{-2}$).
   $b_{min}$—Host minimum emergency braking response (ms$^{-2}$).
$d_{comf,eq}$—the comfortable equalizing distance, the distance lost when comfortably slowing down to a vehicle ahead. Dependent on the following parameters:
   $t_{comf}$—Time to adjust to comfortable braking deceleration (s).
   $\Delta b_{comf}$—Comfortable additional deceleration compared to leading vehicle (ms$^{-2}$).
$d_{cut,f}$—The distance ahead of other vehicles for the region of full effect for the cut component. Dependent on the following parameters:
   $d_{min}$—the closest distance to ever keep to another vehicle longitudinally (m).
$d_{cut,b}$—The distance ahead of other vehicles for the region of full effect for the cut component. Dependent on the following parameters:
   $d_{min}$—the closest distance to ever keep to another vehicle longitudinally (m).

The longitudinal range functions define the longitudinal range of full effect and ramping distances for the object components, as follows:

$$d_{ramp}(v, v_o) = \max(s_{min}, \operatorname{abs}(v - v_o)t_{ramp}) \quad (17)$$

$$d_{pass}(v, v_o, a_o) = v_o t_{trail} + \max\left(0, v t_{switch} \frac{a_o t_a^2}{2}(v_o + a_o t_a) t_{switch} + \frac{a_o t_a^2}{2}\right) \quad (18)$$

$$d_{safe,f}(v, v_o, a_o) = \max\left(0, \frac{v_o + a_o t_{o,r}}{2} t_{o,r} + \frac{(v_o + a_o t_{o,r})^2}{-2 b_{o,min}} - \frac{v^2}{-2 b_{max}}\right) \quad (19)$$

$$d_{safe,b}(v, v_o) = \max\left(0, v t_r + \frac{v^2}{-2 b_{min}} - \frac{v_o^2}{-2 b_{o,max}}\right) \quad (20)$$

$$d_{comf,eq}(v_f, v_b) = \max(0, v_b - v_f) t_{comf} + \frac{\max(0, v_b - v_f)^2}{-2 \Delta b_{comf}} \quad (21)$$

$$d_{cut,f}(v, v_o, a_o, l_o) = \frac{l_o}{2} + d_{safe,f}(v, v_o, a_o) + d_{comf,eq}(v, v_o) \quad (22)$$

$$d_{cut,b}(v, v_o, l_o) = \frac{l_o}{2} + d_{safe,b}(v, v_o) + d_{comf,eq}(v_o, v), \quad (23)$$

where the subscript o indicates that the parameter is that of a vehicle other than the host vehicle, such as object O for which the longitudinal ranges are to be calculated, the subscript f indicates a forward side of the object O relative to its direction of travel and the subscript b indicates a rear side of the object O relative to its direction of travel.

Figure 9:
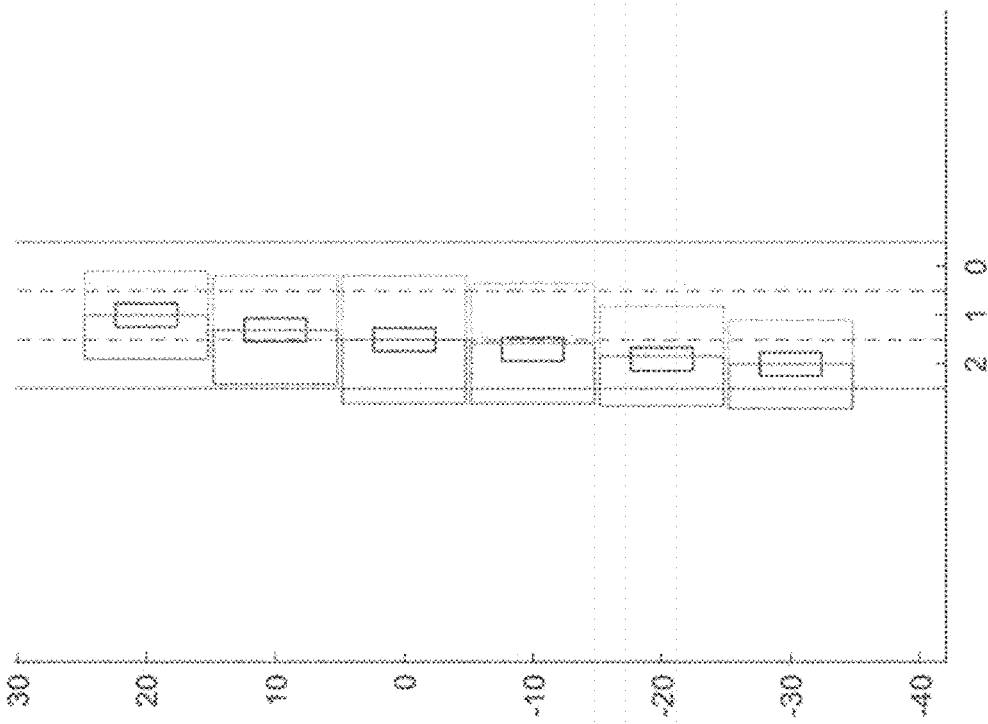
FIG. 9 shows the region of full effect around an object in a lane switch scenario.

By way of example, FIG. 9 shows the region of full effect around an object O in a lane switch scenario calculated using the above lateral and longitudinal range functions.

Using the above lateral and longitudinal range functions, a scalar velocity value for each of the plurality of key lateral positions 24_1 to 24_10 may then be calculated by evaluating the overtaking function $v_{pass}$ for each key lateral position 24_1 to 24_10 at the host vehicle's longitudinal position. Similarly, using the above lateral and longitudinal range functions, a scalar velocity value for each of the plurality of key lateral positions 24_1 to 24_10 may then be calculated by evaluating the no-cut function $v_{no-cut}$ for each key lateral position 24_1 to 24_10 at the host vehicle's longitudinal position.

In accordance with the present example, the overtaking function $v_{pass}$ may be formally defined as follows for each object i, using the object state $O_i$ of that object:

$$k_{x,i} = \min(\text{trapezoid}(-x_i, 0, 1), \qquad (24)$$
$$\text{trapezoid}(x_i, d_{pass}(v_x, v_{x,i}, a_{x,i}), d_{pass}(v_x, v_{x,i}, a_{x,i}) + d_{ramp}(v_x, v_{x,i})))$$

$$k_{y,i}(y_{key}) = \qquad (25)$$
$$\min\begin{pmatrix} \text{trapezoid}(y_{key} - y_i, \Delta y_{range}(y_i, v_{y,i}), \Delta y_{range}(y_i, v_{y,i}) + \\ \Delta y_{bias}), \text{trapezoid}(y_i - y_{key}, 0, 0.5 - \Delta y_{bias}) \end{pmatrix}$$

$$v_{pass,i}(y_{key}) = A_{pass}\text{clip}\left(\frac{v_{des} - v_{o,i} - \Delta v_{pass}}{\Delta v_{pass}}, 0, 1\right)\min(k_{x,i}, k_{y,i}(y_{key})). \qquad (26)$$

where $A_{pass}$ is a scalar value. For example, in the present example embodiment, $A_{pass}$ equals 2.

Figure 10:
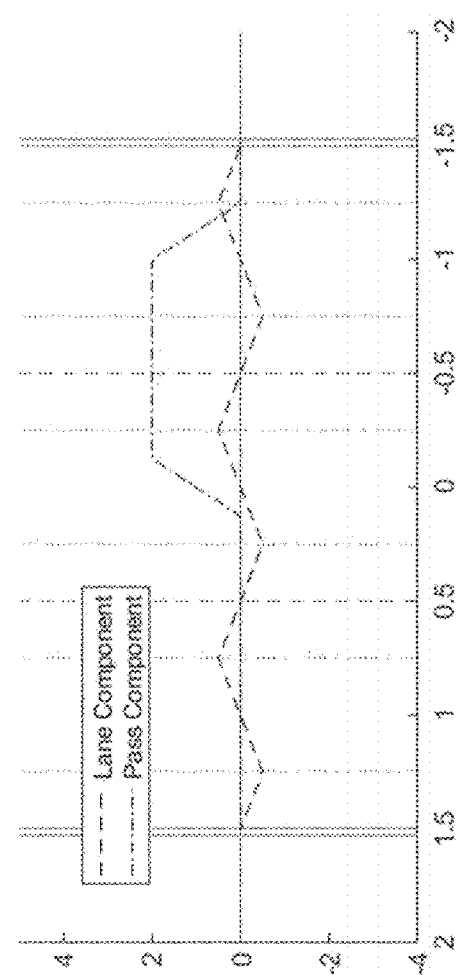
FIG. 10 is a graph illustrating a distribution of values of an overtaking function across the model road shown in FIGS. 2A and 2B.

FIG. 10 is a graph illustrating a distribution of the values of the overtaking function $v_{pass}$ across road 20 shown in FIGS. 2A and 2B. It is noted that, while the overtaking function $v_{pass}$ is defined for all values of y, the overtaking function $v_{pass}$ is only evaluated at the key lateral positions 24_1 to 24_10 and, as will be discussed in more detail below, the generated lateral velocity field is based only on the respective values of the overtaking function calculated in respect of each of the plurality of key lateral positions.

In accordance with the present example, the no-cut function $v_{no-cut}$ may be formally defined as follows for each object i, using the object state $O_i$ of that object:

$$k_{x,i} = \qquad (27)$$
$$\min\begin{pmatrix} \text{trapezoid}(-x_i, d_{cut,f}(v_x, v_{x,i}, a_{x,i}, l_{x,i}), d_{cut,f}(v_x, v_{x,i}, a_{x,i}, l_{x,i}) + \\ d_{ramp}(v_x, v_{x,i})), \text{trapezoid}(x_i, d_{cut,b}(v_x, v_{x,i}, l_{x,i}), \\ d_{cut,b}(v_x, v_{x,i}, l_{x,i}) + d_{ramp}(v_x, v_{x,i})) \end{pmatrix}$$

$$k_{left,i}(y_{key}) = \qquad (28)$$
$$\min\begin{pmatrix} \text{trapezoid}(y_{key} - y_i, \Delta y_{range}(y_i, v_{y,i}), \Delta y_{range}(y_i, v_{y,i}) + \\ \Delta y_{bias}), \text{trapezoid}(y_i - y_{key}, -\Delta y_{bias}, 0) \end{pmatrix}$$

$$k_{right,i}(y_{key}) = \min\begin{pmatrix} \text{trapezoid}(y_i - y_{key}, \Delta y_{range}(-y_i, -v_{y,i}), \\ \Delta y_{range}(-y_i, -v_{y,i}) + \\ \Delta y_{bias}), \text{trapezoid}(y_{key} - y_i, -\Delta y_{bias}, 0) \end{pmatrix} \qquad (29)$$

$$v_{no-cut,i}(y_{key}) = A_{no-cut}(\min(k_{x,i}, k_{left,i}(y_{key})) - \min(k_{x,i}, k_{right,i}(y_{key}))), \qquad (30)$$

where $A_{no-cut}$ is a scalar value. For example, in the present example embodiment, $A_{no-cut}$ equals 3.

Figure 11:
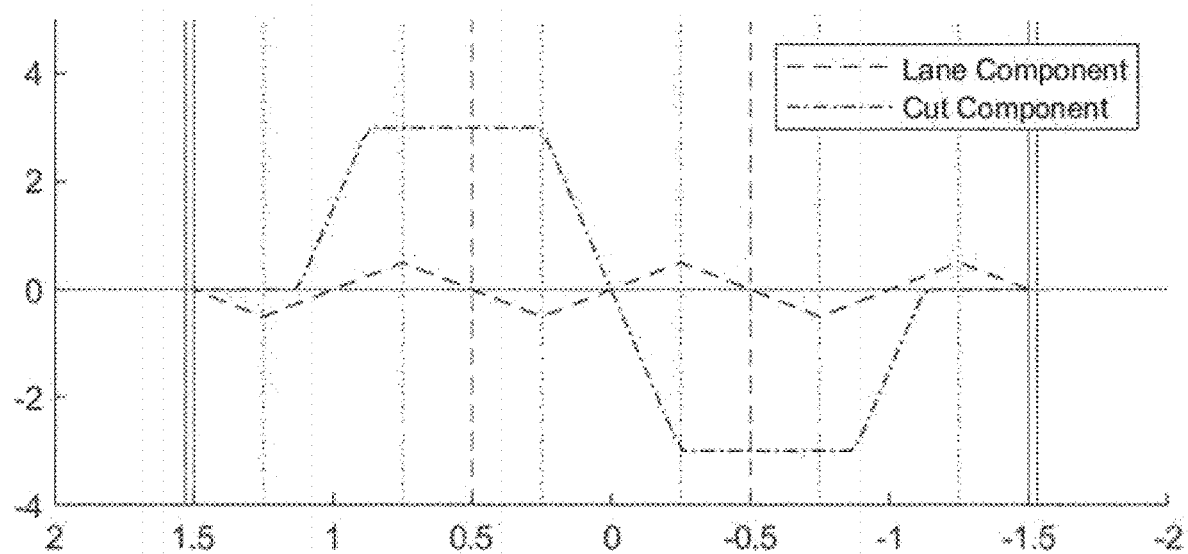
FIG. 11 is a graph illustrating a distribution of values of a no-cut function across the model road shown in FIGS. 2A and 2B.

FIG. 11 is a graph illustrating a distribution of the values of the no-cut function $v_{no-cut}$ across road 20 shown in FIGS. 2A and 2B. It is noted that, while the no-cut function $v_{no-cut}$ is defined for all values of y, the no-cut function $v_{no-cut}$ is only evaluated at the key lateral positions 24_1 to 24_10 and, as will be discussed in more detail below, the generated lateral velocity field is based only on the respective no-cut values calculated in respect of each of the plurality of key lateral positions.

In the above exemplary definitions of the weak preference function $v_{weak}$, the strong preference function $v_{strong}$, the overtaking function $v_{pass}$ and the no-cut function $v_{no-cut}$, the scalar values $A_{weak}$, $A_{strong}$, $A_{pass}$ and $A_{no-cut}$ have values of 1, 3, 2 and 3, respectively, representing a maximum respective magnitude of these functions. Furthermore, in the above exemplary definition of the lane-following scalar velocity function $v_{lane}$, this function has a maximum magnitude of $A_{lane}$. As such, the ratio of $A_{weak}:A_{strong}:A_{pass}:A_{no-cut}:A_{lane}$ is 2:6:4:6:1. That is, the maximum magnitude of each of these scalar velocity functions is selected so that values of each scalar velocity function may bias the autonomous control towards controlling the host vehicle 1 to be driven along the road 20 in accordance with a respective one of the driving rules in that a magnitude of the scalar velocity value resulting from evaluating a particular scalar velocity function at a particular key lateral position 24_1 to 24_10 is indicative of a priority (or importance) of following a respective one of the driving rules at the time at which the scalar velocity function is evaluated relative to other driving rules. It may be noted that the ratio of $A_{weak}:A_{strong}:A_{pass}:A_{no-out}:A_{lane}$ is not limited to the example of 2:6:4:6:1 provided above, and any other ratio may be used provided that it allows lane switching in three levels of priority: $A_{weak}>A_{lane}$, $A_{pass}-A_{weak}>A_{lane}$, $A_{strong}-A_{pass}>A_{lane}$ and $A_{no-cut}$ is greater than or equal to each of $A_{weak}$, $A_{strong}$, $A_{pass}$ and $A_{lane}$. The exact relative magnitudes are thus not important, only that the aforementioned inequalities hold. Generalizing further, a lane switching rule with priority level n can be prioritized over a lane switching rule with priority level n−1, where their amplitudes are $A_n$ and $A_{(n-1)}$ respectively, if the following holds: $A_n-A_{(n-1)}>A_{lane}$. Similarly, a rule with amplitude $A_1$ may prohibit any lane switching rule with amplitude $A_2$ if $A_2-A_1<A_{lane}$, which is why the no-cut component can prohibit a dangerous lane switch.

The values of $A_{weak}$, $A_{strong}$, $A_{pass}$, $A_{no-cut}$ and $A_{lane}$, may, as in the present example embodiment, be selected such that a highest priority is given to the strong preference function $v_{strong}$ and the no-cut function $v_{no-cut}$ and a lowest priority is given to the lane following function $v_{lane}$. In particular, as discussed in detail below, the target velocity value of each key lateral position 24_1 to 24_10 is dependent on the relative magnitudes of the scalar velocity values calculated by evaluating the scalar velocity functions at that key lateral position 24_1 to 24_10 and, as such, a scalar velocity function having a largest maximum magnitude may, when evaluated, tend to result in larger scalar velocity values than a scalar velocity function having a smaller maximum magnitude.

Accordingly, by way of alternative, the values of $A_{weak}$, $A_{strong}$, $A_{pass}$, $A_{no-cut}$ and $A_{lane}$ may be set as any values provided that the relative magnitudes are maintained. More generally, by way of further alternative, the weak preference function $v_{weak}$, the strong preference function $v_{strong}$, the overtaking function $v_{pass}$, the no-cut function $v_{no-cut}$, and the lane-following scalar velocity function V lane may be defined using any suitable function such that the relative maximum magnitudes and, thus, the relative priorities of these scalar velocity functions are maintained.

In process step S42 of FIG. 4, the target lateral velocity generator module 12 combines the scalar velocity values calculated for each key lateral position 24_1 to 24_10 of the plurality of key lateral positions to generate a respective target lateral velocity value for the key lateral position 24_1 to 24_10. The target lateral velocity generator module 12 combines the scalar velocity values calculated for each of the key lateral positions 24_1 to 24_10 by adding a first value, which is the greatest of zero and the scalar velocity values, to a second value, which is the smallest of zero and the scalar velocity values.

As discussed above, the magnitude or other characteristic of the scalar velocity value resulting from evaluating a particular scalar velocity function at a particular key lateral position 24_1 to 24_10 may be indicative of a priority or importance of following a respective one of the driving rules at the time at which the scalar velocity function is evaluated relative to other driving rules. Additionally or alternatively, a magnitude or other characteristic of the scalar velocity value resulting from evaluating a particular scalar velocity function at a particular key lateral position 24_1 to 24_10 may be indicative of a direction in which the host vehicle 1 may move, a velocity with which the host vehicle 1 may move in a particular direction or acceleration with which the host vehicle 1 may move in a particular direction in order to comply with a respective one of the driving rules.

Accordingly, by combining the scalar velocity values calculated for each of the key lateral positions 24_1 to 24_10 by adding a first value, which is the greatest of zero and the scalar velocity values, to a second value, which is the smallest of zero and the scalar velocity values, the resulting target velocity value calculated for a given key lateral position 24_1 to 24_10 will be dependent only on the scalar velocity value having a largest positive value (provided at least one of the calculated scalar velocity values for that key lateral position 24_1 to 24_10 is greater than 0) and the scalar velocity component having a largest negative value (provided at least one of the calculated scalar velocity values for that key lateral position 24_1 to 24_10 is less than 0).

In this way, it may be advantageously ensured that scalar velocity values resulting in opposing behaviors of the host vehicle 1 counteract each other while scalar velocity values resulting in similar behaviors of the host vehicle 1 do not cooperate.

In example embodiments, such as the present example embodiment, in which the overtaking (pass) function and/or the no-cut function may be evaluated at each of the plurality of key lateral positions 24_1 to 24_10 for each object in the environment of the host vehicle, multiple scalar velocity values corresponding to multiple objects in the environment of the host vehicle 1 may be generated from a single scalar velocity function (i.e. scalar velocity values of a same type) in respect of each of the plurality of key lateral positions 24_1 to 24_10. In such example embodiments, combining the scalar velocity values calculated for a given key lateral position 24_1 to 24_10 may include combining multiple scalar velocity values of a same type with the other scalar velocity values generated for that key lateral position 24_1 to 24_10. By way of an example, combining the scalar velocity values calculated for a given key lateral position 24_1 to 24_10 may include combining a single weak preference value, a single strong preference value, two no-cut values and two overtaking values if there are two vehicles in the environment of the host vehicle 1 that affect the lateral velocity field. However, more generally, there may be more than two vehicles in the environment of the host vehicle 1, a single vehicle in the environment of the host vehicle 1 or no other vehicles in the environment of the host vehicle 1 that affect the lateral velocity field at any given moment in time.

By way of example, considering FIG. 2A, in a case where the plurality of scalar velocity functions includes a strong preference function, lane 21C may be set as the host vehicle's preferred lane such that the scalar velocity values obtained by evaluating the strong preference function at the plurality of key lateral positions 24_1 to 24_10 may bias the autonomous control to lead the host vehicle 1 towards the lane 21C and prevent the host vehicle 1 from leaving the lane 21C. However, as object O is relatively close to the position 22 of the host vehicle, in a case where the plurality of scalar velocity functions includes a no-cut function, the scalar velocity values obtained by evaluating the no-cut function at the plurality of key lateral positions 24_1 to 24_10 may bias the autonomous control to prevent the host vehicle 1 from moving into a lane 21C of the object O being overtaken by the host vehicle 1 because a distance along the road 20 between the host vehicle 1 and the object O is less than a threshold distance. As such, by combining the scalar velocity values as in process step S42, the opposing behaviors resulting from the scalar velocity values calculated by evaluating the strong preference function and the no-cut function may counteract to prevent the host vehicle 1 from switching into lane 21C.

By way of further example, considering FIG. 2A, in a case where the plurality of scalar velocity functions includes a strong preference function, lane 21C may be set as the host vehicle's preferred lane such that the scalar velocity values obtained by evaluating the strong preference function at the plurality of key lateral positions 24_1 to 24_10 may bias the autonomous control to lead the host vehicle 1 towards the lane 21C and prevent the host vehicle 1 from leaving the lane 21C. Furthermore, in a case where the plurality of scalar velocity functions includes a weak preference function, lane 21C may be set as the host vehicle's default lane such that the scalar velocity values obtained by evaluating the weak preference function at the plurality of key lateral positions 24_1 to 24_10 may bias the autonomous control to lead the host vehicle 1 towards the default lane 21. In this case, it is not necessary that the host vehicle 1 is led towards the lane 21C to a greater extent (e.g. with a higher velocity or acceleration) because the lane 21C is both the default lane and the preferred lane. It is sufficient that the autonomous control is biased to lead the host vehicle 1 towards lane 21C. As such, combining the scalar velocity values as in process step S42 avoids that the similar behaviors resulting from the scalar velocity values calculated by evaluating the strong preference function and the weak preference function cooperate.

In some example embodiments, all of the scalar velocity values calculated for a given key lateral position by evaluating each of the scalar velocity functions at that key lateral position may be combined as in process step S42. By way of example, a lane-following scalar velocity values, a strong preference value, a weak preference value, a pass value and a no-cut value may be combined for each key lateral position by adding a first value, which is the greatest of zero and the scalar velocity values, to a second value, which is the smallest of zero and the scalar velocity values.

Alternatively, in example embodiments such as the present example of FIGS. 2A and 2B in which the plurality of scalar velocity functions includes a lane-following velocity function and the evaluation module 11 calculates, for each of the plurality of key lateral positions 24_1 to 24_10, a respective lane-following scalar velocity value of the lane-following velocity function, the lane-following scalar velocity values may, as in the present example embodiment, be separately and subsequently combined with an auxiliary velocity value obtained by the combining of the other scalar velocity values calculated for the key lateral position 24_1 to 24_10.

In this way, in a case where all other scalar velocity values counteract each other so as to cancel out, the lane-following scalar velocity values obtained by evaluating the lane-following scalar velocity function may bias the autonomous control to cause the host vehicle 1 to follow the current lane in a stable, self-correcting manner. This may be particularly advantageous for example embodiments in which the lane-following scalar velocity function has a lowest priority among the scalar velocity functions and, therefore, a lowest maximum magnitude such that the lane-following scalar velocity values may otherwise not influence or be very unlikely to influence the value of the target lateral velocity for a given key lateral position 24_1 to 24_10 if any other scalar lateral value had a non-zero value.

For example, in such example embodiments, as part of generating the respective target lateral velocity for each key lateral position 24_1 to 24_10, the target lateral velocity generator module 12 may combine the lane-following scalar velocity value for the key lateral position 24_1 to 24_10 with an auxiliary velocity value obtained by the combining of the scalar velocity values calculated for the key lateral position 24_1 to 24_10. The target lateral velocity generator module 12 may further add a third value, which is the greatest among zero, the lane-following scalar velocity value and the auxiliary velocity value, to a fourth value, which is the smallest among zero, the lane-following scalar velocity value and the auxiliary velocity value.

By way of more specific example, in example embodiments in which the plurality of key lateral positions 24_1 to 24_10 are those defined by equations (1) to (4) and the plurality of scalar velocity functions include the lane-following scalar velocity function $v_{lane}$ as defined in equation (5), the weak preference function $v_{weak}$ as defined in equation (6), the strong preference function $v_{strong}$ as defined in equation (7), the overtaking function $v_{pass}$ as defined in equation (26), and the no-cut function $v_{no\text{-}cut}$, as defined in equation (30), the plurality of scalar velocity values calculated by evaluating each of the plurality of scalar velocity functions in respect of a given key lateral position $y_{key}$ may, as in the present example embodiment, be combined to generate the respective target lateral velocity value $v_{tot}(y_{key})$ for the key lateral position 24_1 to 24_10 using the following equations:

$$F_{aux}(y_{key}) = \{v_{weak}(y_{key}), v_{strong}(y_{key})\} \cup \{v_{pass,i}(y_{key}), v_{no\text{-}cut,i}(y_{key}) \text{ for each object } i\} \quad (31)$$

$$v_{aux}(y_{key}) = \text{clip}(\max(\{0\} \cup F_{aux}(y_{key})) + \min(\{0\} \cup F_{aux}(y_{key})), -2, 2) \quad (32)$$

$$v_{tot}(y_{key}) = \max(\{0, v_{aux}(y_{key}), v_{lane}(y_{key})\}) + \min(\{0, v_{aux}(y_{key}), v_{lane}(y_{key})\}) \quad (33)$$

More generally, once the plurality of scalar velocity values at each key lateral position 24_1 to 24_10 have been combined, the generated target velocity value for each key lateral position 24_1 to 24_10 indicates at least one of a lateral direction in which the host vehicle 1 may move and an urgency with which the vehicle 1 may move.

Figure 12:
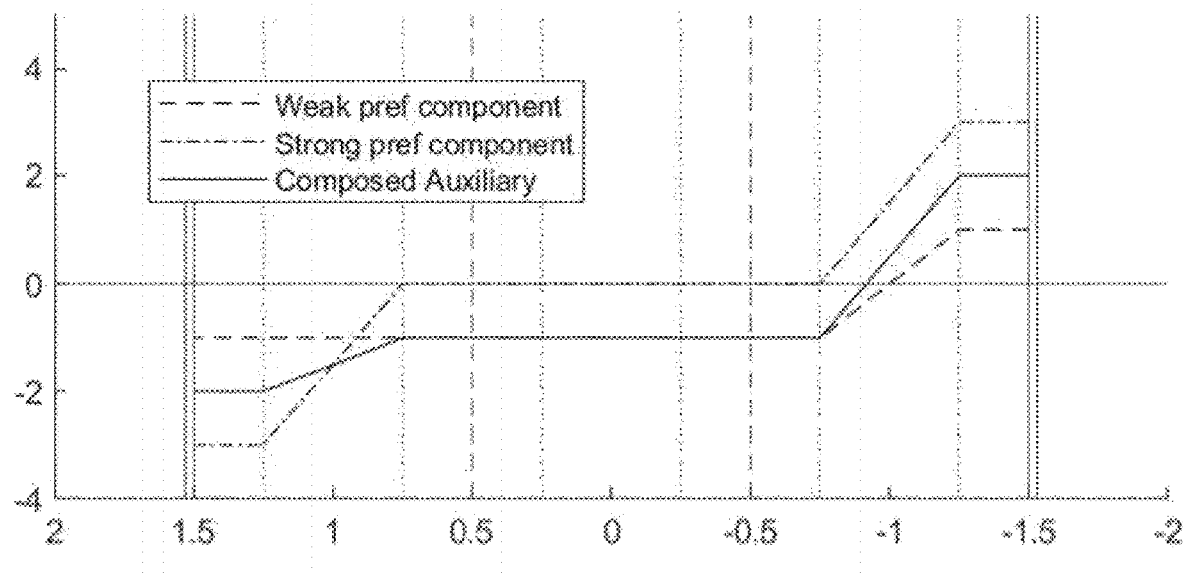
FIG. 12 is a graph illustrating a first example of a distribution of values of auxiliary velocity values across the model road shown in FIGS. 2A and 2B.

By way of example, FIG. 12 is a graph illustrating a first example of the auxiliary velocity values $v_{aux}(y_{key})$ across road 20 shown in FIGS. 2A and 2B. In the example of FIG. 12, the scalar velocity functions include the weak preference function $v_{weak}$ as defined in equation (6) and the strong preference function $v_{strong}$ as defined in equation (7). It is noted that the auxiliary velocity values $v_{aux}(y_{key})$ are only evaluated at the key lateral positions 24_1 to 24_10 and, as such, the linear interpolation shown in FIG. 12 between the respective auxiliary velocity values $v_{aux}(y_{key})$ calculated in respect of each of the plurality of key lateral positions is for ease of visualization only.

Figure 13:
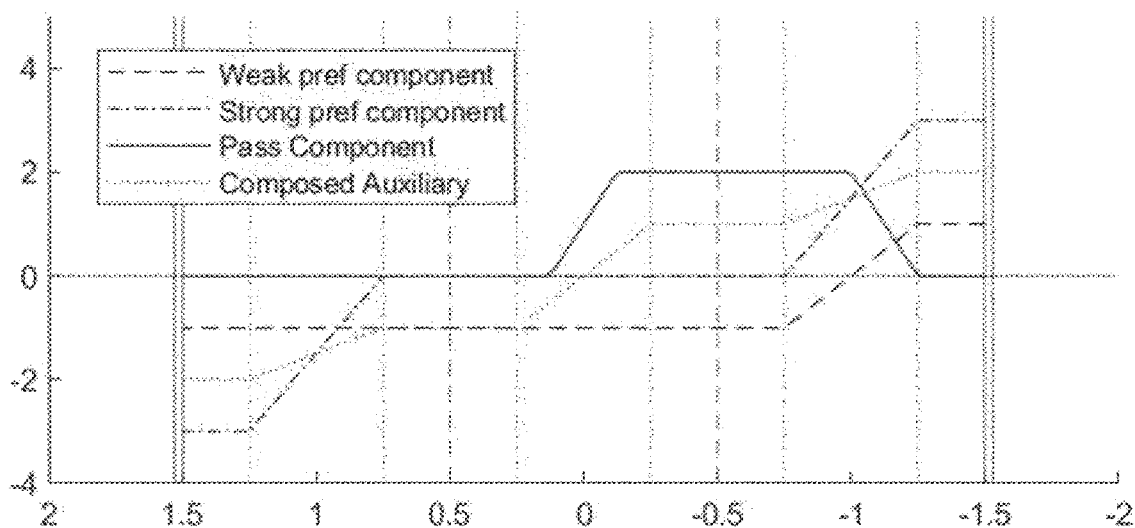
FIG. 13 is a graph illustrating a second example of a distribution of values of auxiliary velocity values across the model road shown in FIGS. 2A and 2B.

By way of further example, FIG. 13 is a graph illustrating a second example of the auxiliary velocity values $v_{aux}(y_{key})$ across road 20 shown in FIGS. 2A and 2B. In the example of FIG. 13, the scalar velocity functions include the weak preference function $v_{weak}$ as defined in equation (6), the strong preference function $v_{strong}$ as defined in equation (7) and the overtaking function $v_{pass}$ as defined in equation (26). It is noted that the auxiliary velocity values $v_{aux}(y_{key})$ are only evaluated at the key lateral positions 24_1 to 24_10 and, as such, the linear interpolation shown in FIG. 13 between the respective auxiliary velocity values $v_{aux}(y_{key})$ calculated in respect of each of the plurality of key lateral positions is for ease of visualization only.

Figure 14:
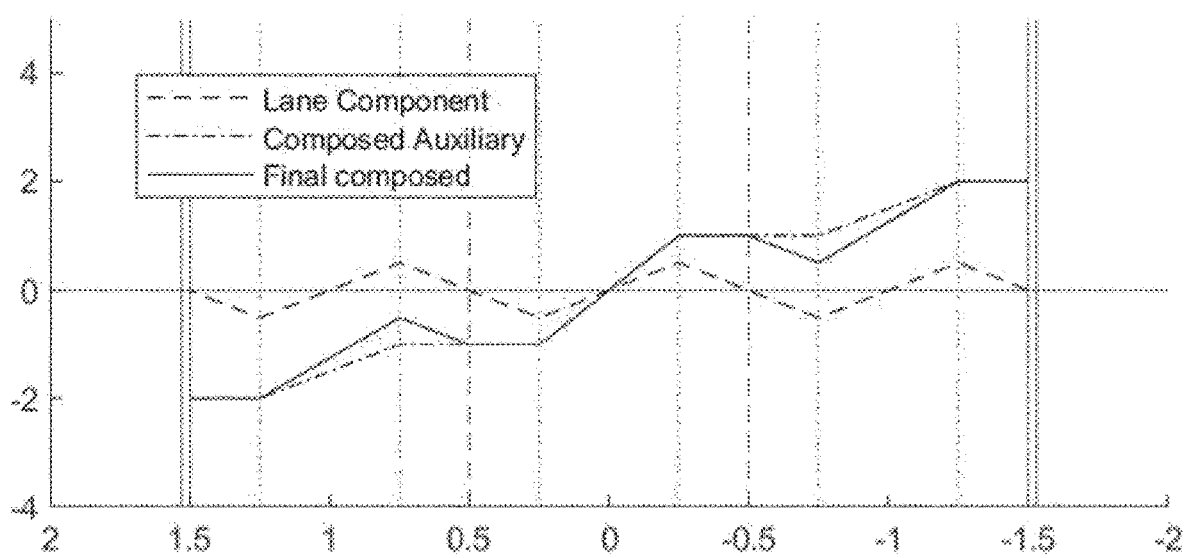
FIG. 14 is a graph illustrating an example of a distribution of values of target velocity values across the model road shown in FIGS. 2A and 2B.

FIG. 14 is a graph illustrating an example of a distribution of the target velocity values $v_{tot}(y_{key})$ across road 20 shown in FIGS. 2A and 2B. In the example of FIG. 13, the scalar velocity functions include the lane-following scalar velocity function $v_{lane}$ as defined in equation (5), the values of which are combined with respective auxiliary velocity values calculated in accordance with equation (32). It is noted that the target velocity values $v_{tot}(y_{key})$ are only evaluated at the key lateral positions 24_1 to 24_10 and, as such, the linear interpolation shown in FIG. 14 between the respective target velocity values $v_{tot}(y_{key})$ calculated in respect of each of the plurality of key lateral positions is for ease of visualization only.

Optionally, in some example embodiments, the target lateral velocity generator module 12 may be further configured to perform a weighting of the generated target velocity values at the plurality of key lateral positions 24_1 to 24_10 so that the host vehicle 1 exhibits more human-like behavior under the autonomous control.

By way of example, as part of generating the respective target lateral velocity for each key lateral position 24_1 to 24_10, the target lateral velocity generator module 12 may further weight, in a case where the key lateral position 24_1, 24_4, 24_7, 24_10 is a boundary of a lane among the plurality of lanes, the target lateral velocity generated for the key lateral position with a first weighting factor. Additionally, the target lateral velocity generator module 12 may further weight, in a case where the key lateral position 24_2, 24_3, 24_5, 24_6, 24_8, 24_9 is an edge of a bias region 25A, 25B, 25C within a lane among the plurality of lanes, the target lateral velocity generated for the key lateral position with a second weighting factor, the first weighting factor being greater than the second weighting factor.

By weighting the generated target velocity values at each key lateral positions 24_1, 24_4, 24_7, 24_10 that is a boundary of the lanes 21A, 21B, 21C with a higher weighting factor and weighting the generated target velocity values at each key lateral positions 24_2, 24_3, 24_5, 24_6, 24_8, 24_9 that is an edge of a bias region 25A, 25B, 25C with a lower weighting factor, the host vehicle 1 will exhibit a more human-like behavior (i.e. a behavior that is more similar to the behavior when the host vehicle 1 is controlled by a safe and responsible human driver), where it will switch lanes more decisively and move about in its lane more carefully.

Additionally or alternatively, the target lateral velocity generator module 12 may be further configured to clip or truncate the generated target velocity values at the plurality of key lateral positions 24_1 to 24_10 so that none of the generated target velocity values exceed a predefined maximum safe lateral velocity.

By way of more detailed example, the target lateral velocity generator module 12 may be further configured to perform a weighting of the generated target velocity values $v_{tot}(y_{key})$ (which may, for example, be that calculated in accordance with equation (33)) at the plurality of key lateral positions 24_1 to 24_10 in accordance with the following equation:

$$v(y_{key}) = \begin{cases} v_{max} \text{clip}(v_{tot}(y_{key}), -1, 1), & \text{for } y_{key} \in Y_b \\ v_\mu v_{tot}(y_{key}), & \text{for } y_{key} \in Y_{left} \cup Y_{right} \end{cases} \quad (34)$$

where $v_{max}$ is the maximum safe lateral velocity, i.e. the peak lateral velocity to be used during lane switching, $v_\mu$ is the peak lateral velocity to be used for setting an offset in the lateral position of the vehicle relative to a lane center (while driving within a lane), in a case where $v_{aux}$ is first clipped to the range (−2, 2). In this case, case $v_{tot}$ will never be larger than 1 leaving the bias region, and so will be the lowest velocity the host vehicle 1 will have when performing two lane switches in a row, and may be set low enough so that the resulting behavior is that the host vehicle 1 is driving almost straight in the middle lane and thus not performing an illegal double lane switch.

In process step S43 of FIG. 4, the lateral velocity field generator module 13 generates a lateral velocity field by interpolating between the target lateral velocity values generated for the plurality of key lateral positions 24_1 to 24_10.

The lateral velocity field generator module 13 may, as in the present example embodiment, be configured to interpolate between the target lateral velocity values generated for each pair of adjacent key lateral positions among the plurality of key lateral positions 24_1 to 24_10. Accordingly, the generated lateral velocity field between any two adjacent key lateral positions is dependent only on the target lateral velocity value of those two adjacent key lateral positions, thereby ensuring the locality of the field.

The lateral velocity field generator module 13 may, for example, be configured to perform quadratic interpolation between the respective target lateral velocity values generated for each pair of adjacent key lateral positions among the plurality of key lateral positions.

More specifically, performing quadratic interpolation between any two adjacent key lateral positions may include defining one or more suitable quadratic functions that are functions of lateral position (e.g. y in the Lane Coordinate System defined in relation to FIGS. 2A and 2B) and which are dependent on the respective target velocity values calculated for the two adjacent key lateral positions and, optionally, the respective lateral coordinates or positions of two adjacent key lateral positions. The lateral velocity field generator module 13 may then evaluate the one or more defined quadratic functions for each position y between the two adjacent key lateral positions in order to generate the lateral velocity field between the two adjacent key lateral positions. The lateral velocity field generator module 13 may then repeat these steps for each pair of adjacent key lateral positions.

The one or more quadratic functions may be defined such that each of the one or more quadratic functions have a derivative of zero at their endpoints. For example, where a single quadratic function is defined, the end points may be the key lateral positions. Alternatively, when more than one quadratic function is defined, e.g. such that the lateral velocity field between any two adjacent key lateral positions is defined in a piece-wise manner, the endpoints of each quadratic function may like in the region between the two adjacent key lateral positions.

By defining the one or more quadratic functions to each have a derivative of zero at their endpoints, it can be ensured that the lateral velocity field is continuous across the lateral axis of the road 20 and does not have any discontinuities while maintaining the locality of the lateral velocity field. In contrast, most smooth interpolation methods such as, for example, splines, Bezier curves, etc., do not guarantee locality.

More specifically, for example, the one or more quadratic functions may be defined as two parabolas with zero derivative at the endpoints, and the lateral velocity field generator module 13 may be configured to perform quadratic interpolation between the respective target lateral velocity values generated for each pair of adjacent key lateral positions among the plurality of key lateral positions in order to generate a lateral velocity field v(y), in accordance with the following equations:

$$\alpha = \frac{|v_0|}{|v_0| |v_1|} \quad (35)$$

$$k = \frac{v_1 - v_0}{(y_1 - y_0)^2} \quad (36)$$

$$v(y) = \begin{cases} v_o + \frac{k(y - y_0)^2}{\alpha}, & \text{for } y \le \alpha \\ v_1 - \frac{k(y_1 - y)^2}{\alpha}, & \text{for } y > \alpha \end{cases} \quad (37)$$

where $v_0$ is the target lateral velocity calculated at a first key lateral position of a pair of adjacent key lateral positions, $y_0$ is the lateral position of the first key lateral position, $v_1$ is the target lateral velocity calculated at a second key lateral position of the pair of adjacent key lateral positions, and $y_1$ is the lateral position of the second key lateral position.

The use of two parabolas with zero derivative at the endpoints in performing quadratic interpolation may be particularly advantageous in that the lateral velocity field thus generated has a parameter α. By setting the value of α as in equation (35) above, it is possible to minimize a jerk for a trajectory derived using the velocity field.

Figure 15:
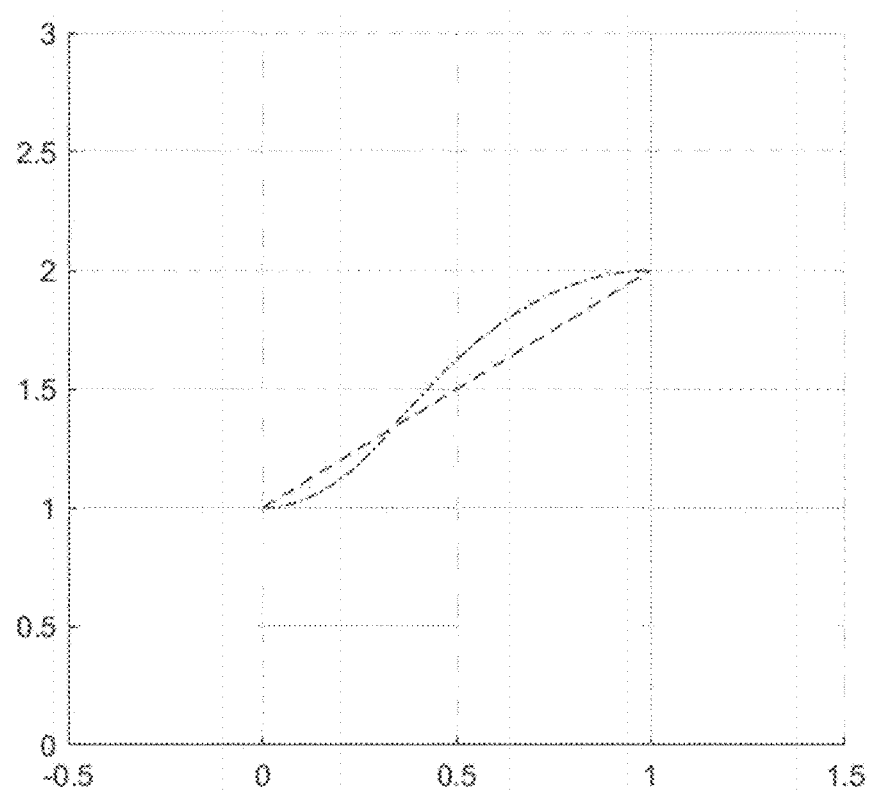
FIG. 15 is a graph illustrating an example of quadratic interpolation between target lateral velocities calculated at two adjacent key lateral positions.

By way of example, FIG. 15 is a graph illustrating an example of interpolation between the calculated target lateral velocities at two adjacent key lateral positions is made by a quadratic interpolation.

Figure 16:
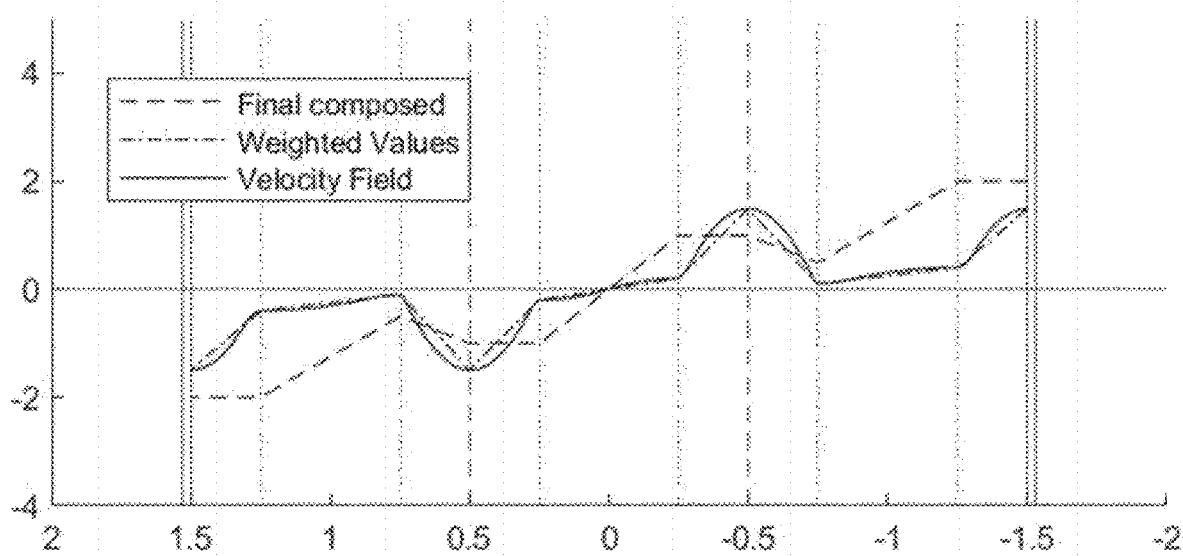
FIG. 16 is a graph illustrating an example of a lateral velocity field determined by the apparatus of the example embodiment.

By way of further example, FIG. 16 is a graph illustrating an exemplary lateral velocity field. The exemplary lateral velocity field of FIG. 12 is subject to a weighting in accordance with equation (34) above and constructed with a quadratic interpolation in accordance with equation (37).

Referring again to FIG. 4, in process step S44, the target lateral acceleration determination module 14 determines the target lateral acceleration of the host vehicle using the generated lateral velocity field and a measured lateral velocity of the host vehicle.

By way of example, the target lateral acceleration determination module 14 may be configured to determine the target lateral acceleration by using the generated lateral velocity field and the measured lateral velocity of the host vehicle to determine the target lateral acceleration of the host vehicle using linear approximation.

For example, the apparatus 10 may be configured carry out process of FIG. 4 in order to determine a target lateral acceleration of the host vehicle 1 at a predefined periodicity or frequency, such that a new target lateral acceleration is determined for each period of time Δt. This period of time Δt may be referred to as a tick length and may be set equal to or less than $t_r$ (the host reaction(adaptation) time (s)) in order to ensure that the autonomously controlled host vehicle 1 will have sufficient time to react to any changes in its environment. In this case, a next lateral position of the host vehicle 1 may be calculated based on the host vehicle's current lateral position, current lateral velocity, and the length of the period of time $\Delta t$. The generated lateral velocity field may then be used to determine the target lateral velocity that the host vehicle may have at that next lateral position and the acceleration required to achieve this target lateral velocity may be determined by linearly interpolating between the current lateral velocity (i.e. measured lateral velocity) of the host vehicle 1 and the target lateral velocity of the host vehicle 1 for that next lateral position.

By way of more specific example, the target lateral acceleration determination module 14 may be configured to determine the target lateral acceleration in accordance with the following equations:

$$y_{next} = y + \frac{v_y}{w}\Delta t \tag{38}$$

$$a = \frac{v(y_{next}) - v_y}{\Delta t}, \tag{39}$$

where $y_{next}$ is the next lateral position of the host vehicle 1, y is the lateral position of the host vehicle 1, $v_y$ is the lateral velocity of the host vehicle 1, w is the width of a lane among the plurality of lanes, and v is the function defining the generated lateral velocity field.

The target lateral acceleration determination module 14 may alternatively be configured to determine the target lateral acceleration by determining the target lateral acceleration of the host vehicle using a cost function-based approach in which the lateral velocity field is used a reference velocity.

Optionally, the target lateral acceleration determination module 14 may be configured to correct the determined target lateral acceleration of the host vehicle 1 using an indication of a local curvature of the road, such that the corrected target lateral acceleration of the host vehicle includes a centripetal component which biases the autonomous control to cause the host vehicle to follow the local curvature of the road. Additionally, the target lateral acceleration determination module 14 may be further configured to project the curvature compensated target lateral acceleration of the host vehicle 1 onto the lateral direction (i.e. the y-axis) in the lane coordinate system. This may be advantageous in later stages to allow control signals for controlling steering and/or acceleration of the host vehicle 1 to cause a lateral acceleration of the host vehicle 1 to approach the determined target lateral acceleration to be generated.

In some example embodiments, the process of FIG. 4 may, as in the present example embodiment, optionally include a further process step S45. In process step S45 of FIG. 4, the apparatus 10 generates control signals for controlling steering and/or acceleration of the host vehicle 1 to cause a lateral acceleration of the host vehicle 1 to approach the determined target lateral acceleration.

Process step S45 may be performed by, for example, the target lateral acceleration determination module 14. Alternatively, the apparatus 10 may optionally include an additional module configured to generate the control signals for controlling steering and/or acceleration of the host vehicle 1 to cause a lateral acceleration of the host vehicle 1 to approach the determined target lateral acceleration.

As a further alternative, in example embodiments where the process of FIG. 4 does not include process step S45, any other suitable entity in the host vehicle may be provided with the target lateral acceleration determined by the target lateral acceleration determination module 14 and be configured to generate control signals for controlling steering and/or acceleration of the host vehicle 1 to cause a lateral acceleration of the host vehicle 1 to approach the determined target lateral acceleration. By way of example, the automatic driver system 15 shown in FIG. 1B may optionally be configured to generate control signals for controlling steering and/or acceleration of the host vehicle 1 to cause a lateral acceleration of the host vehicle 1 to approach the determined target lateral acceleration.

The verb "biasing" is used herein to refer to (among other things) the setting an offset in an equilibrium lateral position of the host vehicle 1 relative to a center of a lane within which it is being driven. "Biasing" in this context is often done by humans as a consequence of a simple preference to have an extra margin to the left or the right of the vehicle, or for extra safety margins when, for example, overtaking a wide vehicle. In example embodiments described herein, the host vehicle 1 may try to "bias" away from other vehicles when overtaking or when being overtaken, for example, in order to provide extra margin. Furthermore, as the different components ramp up, such as the pass component, the host vehicle 1 may gradually increase its bias, until the component value is high enough to cross an edge of the bias region, at which point the host vehicle 1 will move completely into the bias region of the target lane.

The example aspects described here avoid limitations, specifically rooted in computer technology, relating to autonomous driving and, in particular, techniques for determining a target lateral acceleration of a host vehicle relative to a road along which the host vehicle is travelling, for use in autonomous control of the host vehicle. By virtue of the example aspects described herein, abrupt movements of the host vehicle that are uncomfortable for a driver/passenger of the host vehicle and not sufficiently human-like can be avoided. Furthermore, by virtue of the example aspects described herein, target lateral accelerations that result in unreasonably low velocities can be avoided, and scaling to higher "levels of priority" among various driving rules to be followed can be allowed when autonomously controlling a host vehicle. Also, by virtue of the foregoing capabilities of the example aspects described herein, which are rooted in computer technology, the example aspects described herein improve computers and computer processing/functionality, and also improve the field(s) of at least autonomous driving.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s) that various changes in form and detail can be made therein. Thus, the present disclosure should not be limited by any of the above described example embodiments but should also be defined in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements, and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the claims, the foregoing description, and changes that come within the meaning and range of equivalence are embraced therein.

What is claimed is:

1. A method of determining a target lateral acceleration of a host vehicle, the method performed by at least one processor and comprising:
   evaluating a plurality of scalar velocity functions at a plurality of key lateral positions predefined with respect to a model of a road along which the host vehicle is traveling;
   generating, for each of the scalar velocity functions and key lateral positions, a scalar velocity value that biases an autonomous control towards a driving rule;

combining, for each of the key lateral positions, the scalar velocity values for the respective key lateral position to generate a target lateral velocity value for the respective key lateral position, the combining comprising adding a first value that is a greatest of zero and the scalar velocity values for the respective key lateral position to a second value that is a smallest of zero and the scalar velocity values for the respective key lateral position;

generating a lateral velocity field by interpolating between the target lateral velocity values generated for the plurality of key lateral positions;

determining the target lateral acceleration of the host vehicle based on the lateral velocity field and a measured lateral velocity of the host vehicle; and generating control signals for controlling at least one of steering or acceleration of the host vehicle to minimize a difference between a measured lateral acceleration of the host vehicle and the determined target lateral acceleration.

2. The method according to claim 1, wherein:

the road comprises a plurality of lanes;

one of the scalar velocity functions biases the autonomous control towards remaining within one of the plurality of lanes; and the method further comprises:
 calculating, for each of the key lateral positions, a lane-following scalar velocity value based on the one of the scalar velocity functions, and
 generating the target lateral velocity for the respective key lateral position further comprises combining the lane-following scalar velocity value for the respective key lateral position with an auxiliary velocity value obtained by the combining of the scalar velocity values calculated for the respective key lateral position, by adding a third value, which is the greatest among zero, the lane-following scalar velocity value and the auxiliary velocity value, to a fourth value, which is the smallest among zero, the lane-following scalar velocity value and the auxiliary velocity value.

3. The method according to claim 1, wherein:

the road comprises a plurality of lanes; and the scalar velocity functions comprise two or more of:
 a weak preference function that biases the autonomous control towards a default lane among the lanes;
 a strong preference function that biases the autonomous control towards a preferred lane among the lanes when the host vehicle is not in the preferred lane and towards preventing the host vehicle from leaving the preferred lane when the host vehicle is in the preferred lane;
 an overtaking function that biases the autonomous control towards a faster lane among the lanes in a case where the host vehicle is approaching a slower-moving vehicle; and
 a no-cut function that biases the autonomous control towards preventing moving into a lane of a vehicle being overtaken by the host vehicle in a case where a distance along the road between the host vehicle and the vehicle being overtaken is less than a threshold distance.

4. The method according to claim 1, wherein:

the road comprises a plurality of lanes; and each of the key lateral positions comprises:
 a boundary of one of the lanes; or
 an edge of a bias region within one of the lanes, the bias region extending along the one of the lanes.

5. The method according to claim 4, wherein the generating the target lateral velocity for the respective key lateral position further comprises:
 when the respective key lateral position is a boundary of one of the lanes, weighting the target lateral velocity value generated for the respective key lateral position with a first weighting factor; or
 when the respective key lateral position is an edge of a bias region within one of the lanes, weighting the target lateral velocity value generated for the respective key lateral position with a second weighting factor,
 the first weighting factor being greater than the second weighting factor.

6. The method according to claim 1, wherein the interpolating between the target lateral velocity values comprises:
 performing quadratic interpolation between the target lateral velocity values for each pair of adjacent key lateral positions.

7. The method according to claim 1, wherein the determining the target lateral acceleration comprises:
 determining the target lateral acceleration using linear approximation; or
 determining the target lateral acceleration using a cost function-based approach in which the lateral velocity field is used a reference velocity within the cost function-based approach.

8. The method according to claim 1, further comprising determining a corrected target lateral acceleration of the host vehicle by correcting the target lateral acceleration of the host vehicle based on an indication of a local curvature of the road, the corrected target lateral acceleration of the host vehicle comprising a centripetal component that biases the autonomous control towards following the local curvature of the road.

9. At least one non-transitory computer-readable storage medium comprising instructions, that, when executed by at least one processor, cause the processor to:
 evaluate a plurality of scalar velocity functions corresponding to respective driving rules at each of a plurality of key lateral positions that are predefined with respect to a model of a road along which a host vehicle is traveling to generate respective scalar velocity values that bias an autonomous control of the host vehicle;
 combine the scalar velocity values at each of the key lateral positions to generate respective target lateral velocity values for the key lateral positions, the combining comprising adding first values that are a greatest of zero and the respective scalar velocity values for the key lateral positions to second values that are a smallest of zero and the respective scalar velocity values for the key lateral positions;
 generate a lateral velocity field by interpolating between the target lateral velocity values;
 determine a target lateral acceleration of the host vehicle based on the lateral velocity field and a measured lateral velocity of the host vehicle; and
 generate control signals for controlling at least one of steering or acceleration of the host vehicle to minimize a difference between a measured lateral acceleration of the host vehicle and the determined target lateral acceleration.

10. An apparatus comprising at least one processor configured to:
evaluate a plurality of scalar velocity functions corresponding to respective driving rules at each of a plurality of key lateral positions that are predefined with respect to a model of a road along which a host vehicle is traveling to generate respective scalar velocity values that bias an autonomous control of the host vehicle;
combine the scalar velocity values at each of the key lateral positions to generate respective target lateral velocity values for the key lateral positions, the combining comprising adding first values that are a greatest of zero and the respective scalar velocity values for the key lateral positions to second values that are a smallest of zero and the respective scalar velocity values for the key lateral positions;
generate a lateral velocity field by interpolating between the target lateral velocity values;
determine a target lateral acceleration of the host vehicle based on the lateral velocity field and a measured lateral velocity of the host vehicle; and
generate control signals for controlling at least one of steering or acceleration of the host vehicle to minimize a difference between a measured lateral acceleration of the host vehicle and the determined target lateral acceleration.

11. The apparatus of claim 10, wherein:
the road comprises a plurality of lanes;
one of the scalar velocity functions generates lane-following scalar velocity values that bias the autonomous control towards remaining within one of the plurality of lanes; and
the processor is further configured to generate the respective target lateral velocity values by combining the respective lane-following scalar velocity values for the key lateral positions with respective auxiliary velocity values obtained by the combining of the scalar velocity values by adding respective third values that are the greatest among zero, the respective lane-following scalar velocity values, and the respective auxiliary velocity values to fourth values that are the smallest among zero, the respective lane-following scalar velocity values, and the respective auxiliary velocity values.

12. The apparatus of claim 10, wherein:
the road comprises a plurality of lanes; and
the scalar velocity functions comprise two or more of:
a weak preference function that generates scalar velocity values that bias the autonomous control towards a default lane among the lanes;
a strong preference function that generates scalar velocity values that bias the autonomous control towards a preferred lane among the lanes when the host vehicle is not in the preferred lane and towards preventing the host vehicle from leaving the preferred lane when the host vehicle is in the preferred lane;
an overtaking function that generates scalar velocity values that bias the autonomous control towards a faster lane among the lanes in a case where the host vehicle is approaching a slower-moving vehicle; and
a no-cut function that generates scalar velocity values that bias the autonomous control towards preventing moving into a lane of a vehicle being overtaken by the host vehicle in a case where a distance along the road between the host vehicle and the vehicle being overtaken is less than a threshold distance.

13. The apparatus of claim 10, wherein:
the road comprises a plurality of lanes; and
each of the key lateral positions comprises:
a boundary of one of the lanes; or
an edge of a bias region within one of the lanes, the bias region extending along the one of the lanes.

14. The apparatus of claim 13, wherein the generation of the target lateral velocity values further comprises:
when a key lateral position is a boundary of one of the lanes, weighting the respective target lateral velocity value with a first weighting factor; or
when a key lateral position is an edge of a bias region within one of the lanes, weighting the respective target lateral velocity value generated for the respective key lateral position with a second weighting factor,
the first weighting factor being greater than the second weighting factor.

15. The apparatus of claim 10, wherein the interpolation between the target lateral velocity values comprises:
performing quadratic interpolation between the target lateral velocity values for each pair of adjacent key lateral positions.

16. The apparatus of claim 10, wherein the determination of the target lateral acceleration comprises:
determining the target lateral acceleration using linear approximation; or
determining the target lateral acceleration using a cost function-based approach in which the lateral velocity field is used a reference velocity within the cost function-based approach.

17. The apparatus of claim 10, wherein the processor is further configured to determine a corrected target lateral acceleration of the host vehicle by correcting the target lateral acceleration of the host vehicle based on an indication of a local curvature of the road, the corrected target lateral acceleration of the host vehicle comprising a centripetal component that biases the autonomous control towards following the local curvature of the road.

18. The apparatus of claim 10, wherein the apparatus is configured to be within the host vehicle.

* * * * *

UNITED STATES PATENT AND TRADEMARK OFFICE
CERTIFICATE OF CORRECTION

| | | |
|---|---|---|
| PATENT NO. | : 11,780,461 B2 | Page 1 of 1 |
| APPLICATION NO. | : 17/455666 | |
| DATED | : October 10, 2023 | |
| INVENTOR(S) | : Oskar Larsson | |

It is certified that error appears in the above-identified patent and that said Letters Patent is hereby corrected as shown below:

On the Title Page

On page 2, at Column 2, item (56) Other Publications, Line 14, delete "Enironment" and insert --Environment:--.

Signed and Sealed this
Fifteenth Day of April, 2025

Coke Morgan Stewart
*Acting Director of the United States Patent and Trademark Office*